United States Patent
Giger et al.

[11] Patent Number: 5,984,870
[45] Date of Patent: Nov. 16, 1999

[54] METHOD AND SYSTEM FOR THE AUTOMATED ANALYSIS OF LESIONS IN ULTRASOUND IMAGES

[75] Inventors: Maryellen L. Giger, Elmhurst; Hania Al-Hallaq, Chicago; Dulcy Wolverton, Chicago; Ulrich Bick, Chicago, all of Ill.

[73] Assignee: Arch Development Corporation, Chicago, Ill.

[21] Appl. No.: 08/900,192

[22] Filed: Jul. 25, 1997

[51] Int. Cl.$^6$ ............................................. A61B 8/00
[52] U.S. Cl. ............................................. 600/443
[58] Field of Search .................. 600/407, 437, 600/443; 128/915; 382/132, 286–287

[56] References Cited

U.S. PATENT DOCUMENTS

| | | |
|---|---|---|
| 4,907,156 | 3/1990 | Doi et al. . |
| 5,003,979 | 4/1991 | Merichel et al. ............ 128/915 |
| 5,133,020 | 7/1992 | Giger et al. . |
| 5,260,871 | 11/1993 | Goldberg ............... 364/413.02 |
| 5,279,301 | 1/1994 | Tsukaya et al. ............ 600/442 |
| 5,289,374 | 2/1994 | Doi et al. ............... 364/413.13 |
| 5,452,367 | 9/1995 | Bick et al. . |
| 5,491,627 | 2/1996 | Zhang et al. ............ 364/413.2 |
| 5,537,485 | 7/1996 | Nishikawa et al. . |
| 5,638,458 | 6/1997 | Giger et al. . |
| 5,640,956 | 6/1997 | Getzinger et al. ............ 600/437 |
| 5,657,362 | 8/1997 | Giger et al. . |
| 5,740,268 | 4/1998 | Nishikawa et al. ............ 382/132 |
| 5,754,676 | 5/1998 | Komiya et al. ............ 382/132 |

*Primary Examiner*—Francis J. Jaworski
*Attorney, Agent, or Firm*—Oblon, Spivak, McClelland, Maier & Neustadt, P.C.

[57] ABSTRACT

A method and apparatus for the computerized automatic analysis of lesions in ultrasound images, including the computerized analysis of lesions in the breast, using gradient, gray-level, and texture based measures. Echogenicity features are developed to assess the characteristics of the lesions and in some cases give an estimate of the likelihood of malignancy or of prognosis. The output from the computerized analysis is used in making a diagnosis and/or prognosis. For example, with the analysis of the ultrasound images of the breast, the features can be used to either distinguish between malignant and benign lesions, or distinguish between (i.e., diagnosis) the types of benign lesions such as benign solid lesions (e.g., fibroadenoma), simple cysts, complex cysts, and benign cysts. The ultrasound image features can be merged with those from mammographic and/or magnetic resonance images of the same lesion for classification by means of a common artificial neural network.

66 Claims, 25 Drawing Sheets

Gray level and texture features can be calculated within ROI or within the outlined lesion.

Here deep to the lesion, the features are calculated within the ROI.

posterior shadowing $$P = \frac{\text{Gray level within lesion}}{\text{Gray level deep to lesion}}$$

P will be equal or greater than one.

posterior enhancement $$P = \frac{\text{Gray level within lesion}}{\text{Gray level deep to lesion}}$$

P will less than one.

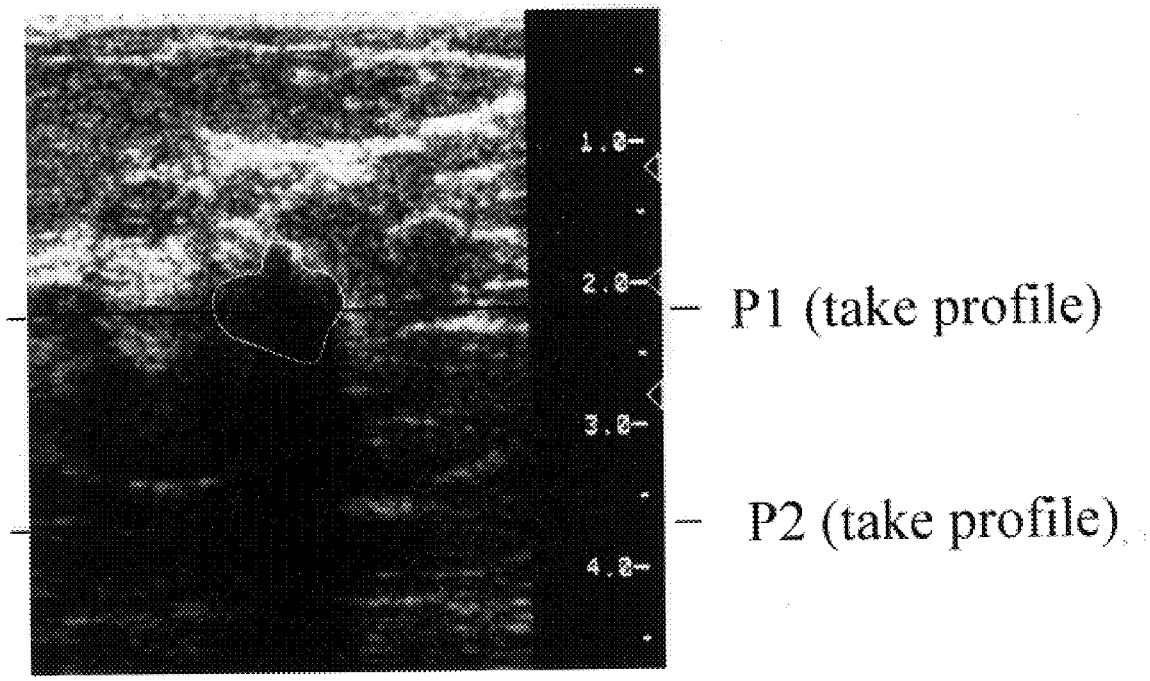
FIG.8A(1)
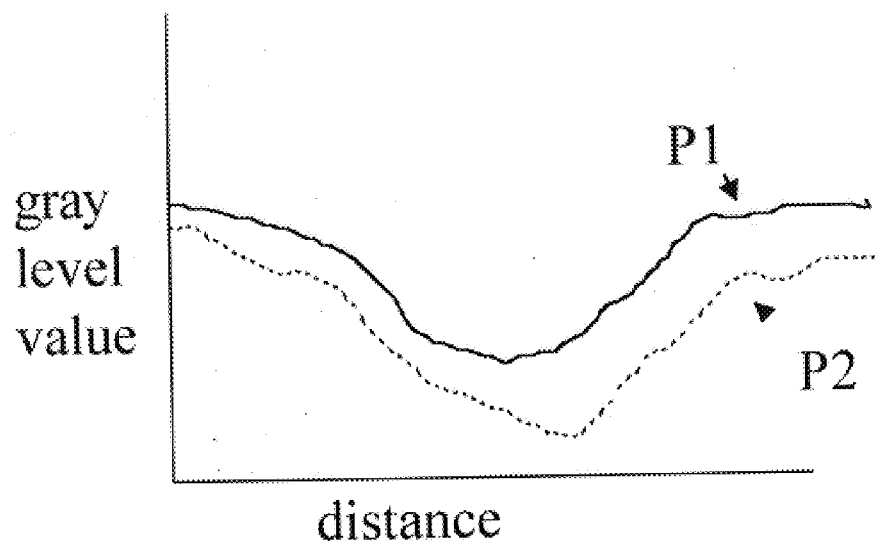
FIG.8A(2)

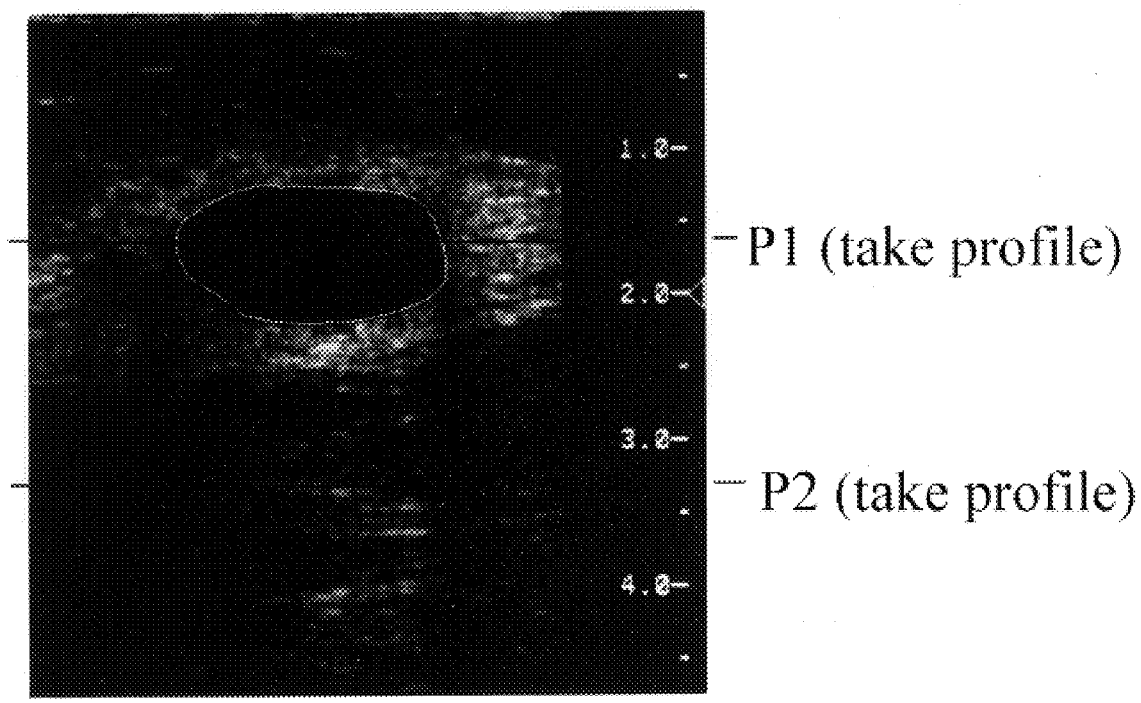
FIG.8B(1)
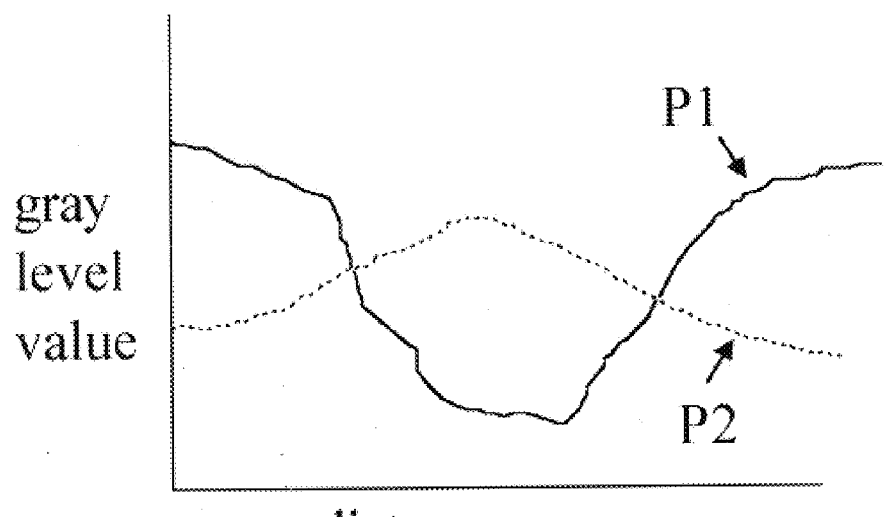
FIG.8B(2)

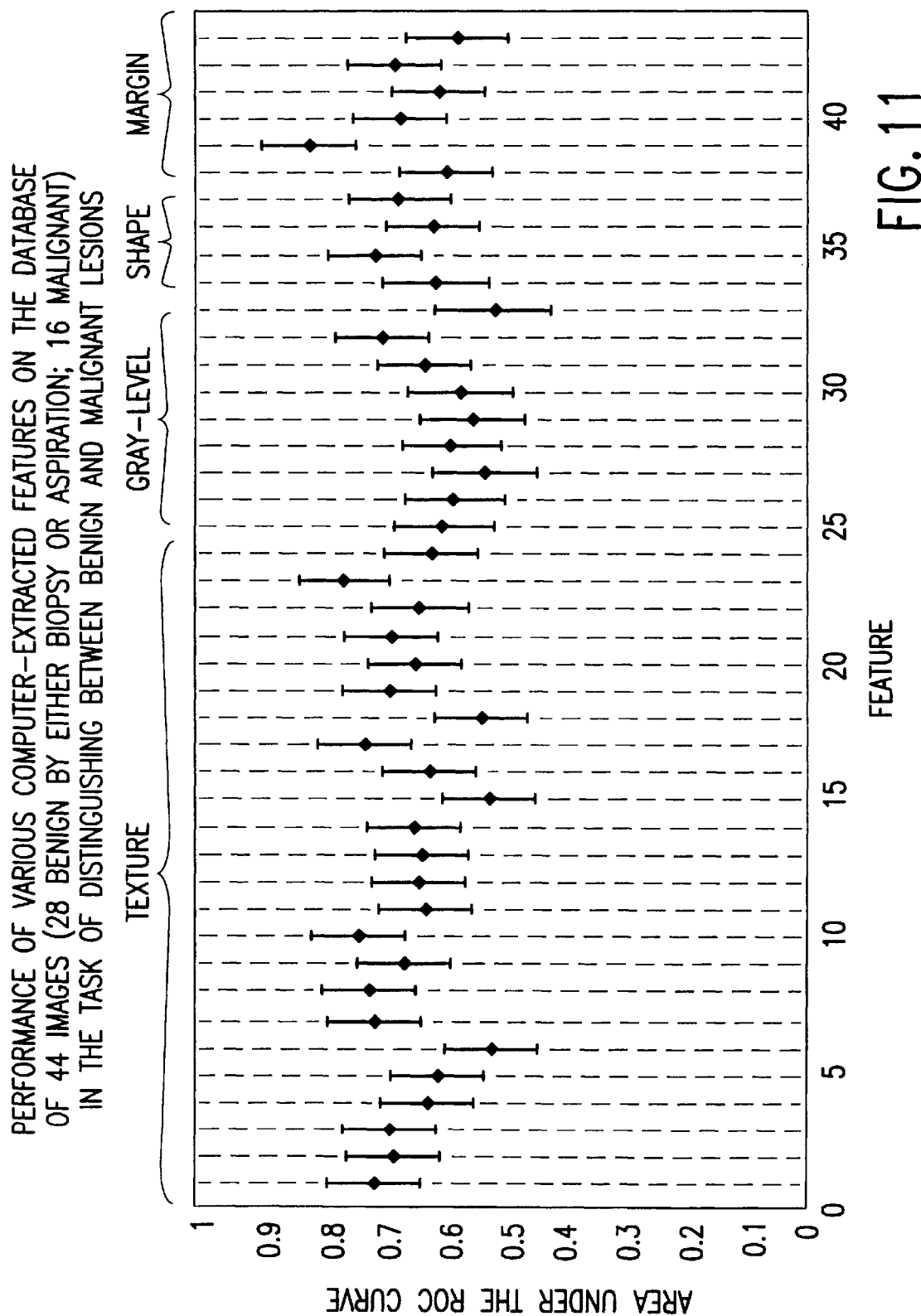

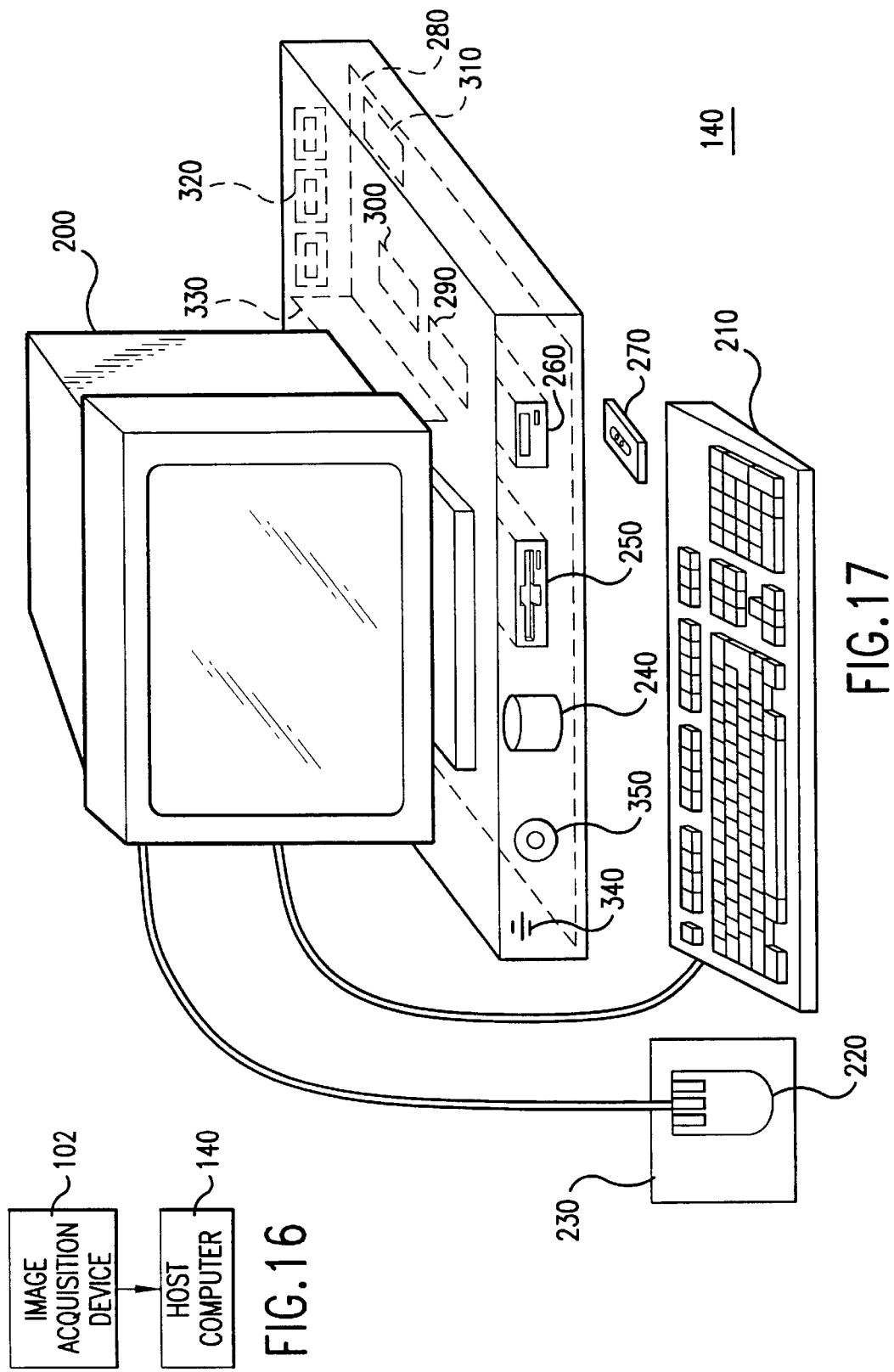

METHOD AND SYSTEM FOR THE AUTOMATED ANALYSIS OF LESIONS IN ULTRASOUND IMAGES

The present invention was made in part with U.S. Government Support Under grant numbers USPHS CA 48985 and USPHS AR 42739 (National Cancer Institute, National Institutes of Health, and Department of Health and Human Services, as well as MRH DAMD 17-93-J-3021 and MRH DAMD 71-96-1-6058 (U.S. Army, Department of Defense). The U.S. Government has certain rights in the invention.

BACKGROUND OF THE INVENTION

1. Field of the Invention

The invention relates generally to a method and system for the computerized automatic analysis of lesions in ultrasound images. Specifically the system includes the computerized analysis of lesions in the breast using gradient, gray-level, and texture based measures. Techniques include novel developments and implementations of echogenicity features to assess the characteristics of the lesions and in some cases give an estimate of the likelihood of malignancy or of prognosis. Output from the computerized analysis can related to and used in the diagnostic decision making process.

The present invention generally relates to CAD techniques for automated detection of abnormalities in digital images, for example as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; and 5,740,268; as well as U.S. patent applications Ser. Nos. 08/158,388; 08/173,935; 08/220,917; 08/398,307; 08/428,867; 08/523,210; 08/536,149; 08/536,450; 08/515,798; 08/562,087; 08/757,611; 08/758,438; 08/900,191; 08/900,188; 08/900,189; and 08/900,192. The present invention includes use of technologies referenced and described therein, as well as described in the references identified in the appended APPENDIX and cross-referenced throughout the specification by reference to the number, in brackets, of the respective reference listed in the APPENDIX, the entire contents of which, including the related patents and applications listed above and references listed in the APPENDIX, are incorporated herein by reference.

2. Discussion of the Background

Breast cancer is a leading cause of death in women, causing an estimated 46,000 deaths per year [1]. Mammography is the most effective method for the early detection of breast cancer, and it has been shown that periodic screening of asymptomatic women does reduce mortality [2–4]. Various medical organizations have recommended the use of mammographic screening for the early detection of breast cancer. Thus, mammography is becoming one of the largest volume x-ray procedures routinely interpreted by radiologists. Many breast cancers are detected and referred for surgical biopsy on the basis of a radiographically detected mass lesion or cluster of microcalcifications. Although general rules for the differentiation between benign and malignant mammographically identified breast lesions exist [5, 6], considerable misclassification of lesions occurs with the current methods. On average, less than 30% of masses referred for surgical breast biopsy are actually malignant [7]. A computerized method capable of detecting and analyzing the characteristics of benign and malignant masses, in an objective manner, can aid radiologists by reducing the numbers of false-positive diagnoses of malignancies, thereby decreasing patient morbidity as well as the number of surgical biopsies performed and their associated complications [8].

Breast sonography is used as an important adjunct to diagnostic mammography and is typically performed to evaluate palpable and mammographically identified masses in order to determine their cystic vs. solid natures. The accuracy of ultrasound has been reported to be 96–100% in the diagnosis of simple benign cysts [9]. Masses so characterized do not require further evaluation; however, 75% of masses prove to be indeterminate or solid on sonography and are candidates for further intervention [10]. Ultrasound has not been used for screening purposes due to relatively high false-negative and false-positive rates [11]. Also, breast sonography has not been routinely used to distinguish benign from malignant solid masses because of the considerable overlap in their sonographic appearances [12]. With the advent of modem high-frequency transducers that have improved spatial and contrast resolution, a number of sonographic features have emerged as potential indicators of malignancy, while other features are typical for benign masses [13, 14]. Benign features include hyperechogenicity, ellipsoid shape, mild lobulation, and a thin, echogenic pseudocapsule. Malignant features include spiculation, angular margins, marked hypoechogenicity, posterior acoustic shadowing, and depth:width ratio greater than 0.8. Recently, Stavros, et al., used these and other features to characterize masses as benign, indeterminate, and malignant [15]. Their classification scheme had a sensitivity of 98.4% and a negative predictive value of 99.5%. However, the sonographic evaluation described by these investigators is much more extensive and complex than is usually performed at most breast imaging centers. Ultrasound examination is a notoriously operator-dependent modality, and until these encouraging results are corroborated through additional studies by other investigators, it is unclear how widely applicable this sonographic classification scheme will be.

An automated technique that can objectively and reliably classify lesions based upon reported sonographic characteristics of benign and malignant masses, especially if combined with their mammographic features, could significantly improve the specificity of breast imaging evaluation of breast masses. Computer-aided techniques have been applied to the color Doppler evaluation of breast masses with promising results [16]. However, color Doppler imaging is a technique which focuses only upon the vascularity of lesions. Since not all sonographically visible cancers have demonstrable neovascularity, this technique is inherently somewhat limited. On the other hand, computer-aided diagnosis techniques applied to gray-scale sonographic images has not yet been reported.

SUMMARY OF THE INVENTION

Accordingly, an object of this invention is to provide a method and system for the analysis of lesions in ultrasound images.

Another object of this invention is to provide a new and improved noninvasive, computerized method and system for analyzing gray-scale ultrasound images of breast lesions.

Another object of the invention is to provide an automated method and system for the characterization of lesions using computer-extracted features from ultrasound images of the breast.

Another object of the invention is to provide an automated method and system for determination of echogenicity features to assess the characteristics of the lesions in ultrasound images.

Another object of the invention is to provide an automated method and system for determining an estimate of the likelihood of malignancy (diagnosis) or of prognosis of a lesion on an ultrasound image.

Another object of the invention is to provide an automated method and system for discriminating among types of benign lesions on an ultrasound image.

Another object of the invention is to provide an automated method and system merging computer-extracted information from mammographic and ultrasound images.

Still further objects of this invention are to provide a new and improved method and system which aids radiologists in distinguishing between benign and malignant lesions and thus aids in reducing unnecessary biopsies.

These and other objects are achieved according to the invention by providing a new and improved automated method and system in which gray-scale ultrasound image data is generated and computerized analysis and characterization of a lesion in gray-scale ultrasound data is performed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8a and 8b are illustrations of a malignant lesion and a simple cyst and provide a comparison in which the amount of shadowing and enhancement can be determined by examining profiles through the lesion/cyst;

FIG. 11 is a chart illustrating Az values (Az is the area under the ROC curve) for the various computer-extracted features on a database of 44 ultrasound images (16 malignant, 28 benign by biopsy or aspiration), in the task of distinguishing between malignant and benign lesions;

FIG. 16 is a block diagram of a computerized implementation of the method of the invention; and FIG. 17 is a schematic illustration of the computer shown in FIG. 16.

DETAILED DESCRIPTION OF THE PREFERRED EMBODIMENTS

Figure 1A:
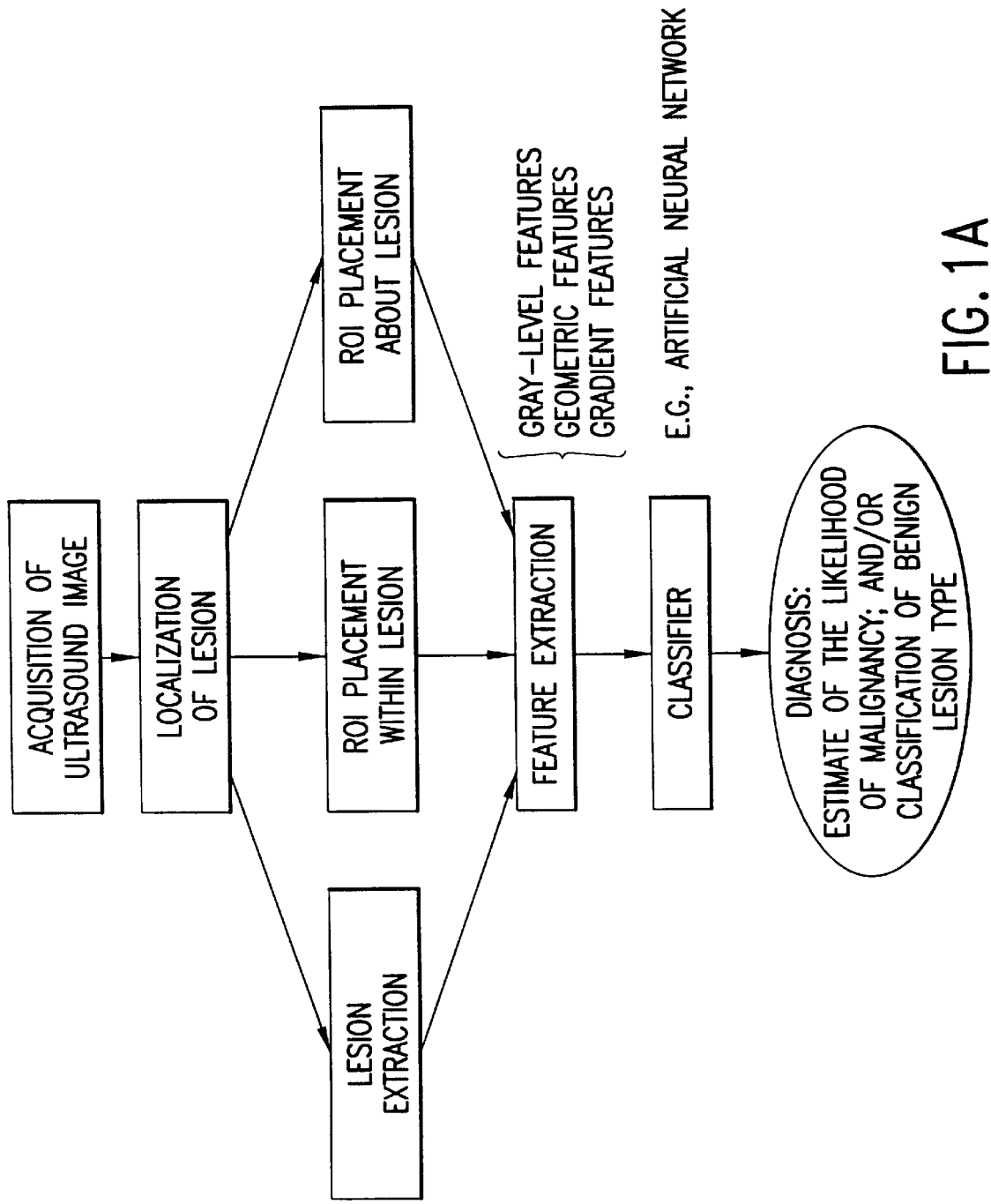
FIG. 1 is a schematic diagram illustrating the automated method for the analysis of lesions in ultrasound images according to the present invention.
Figure 1B:
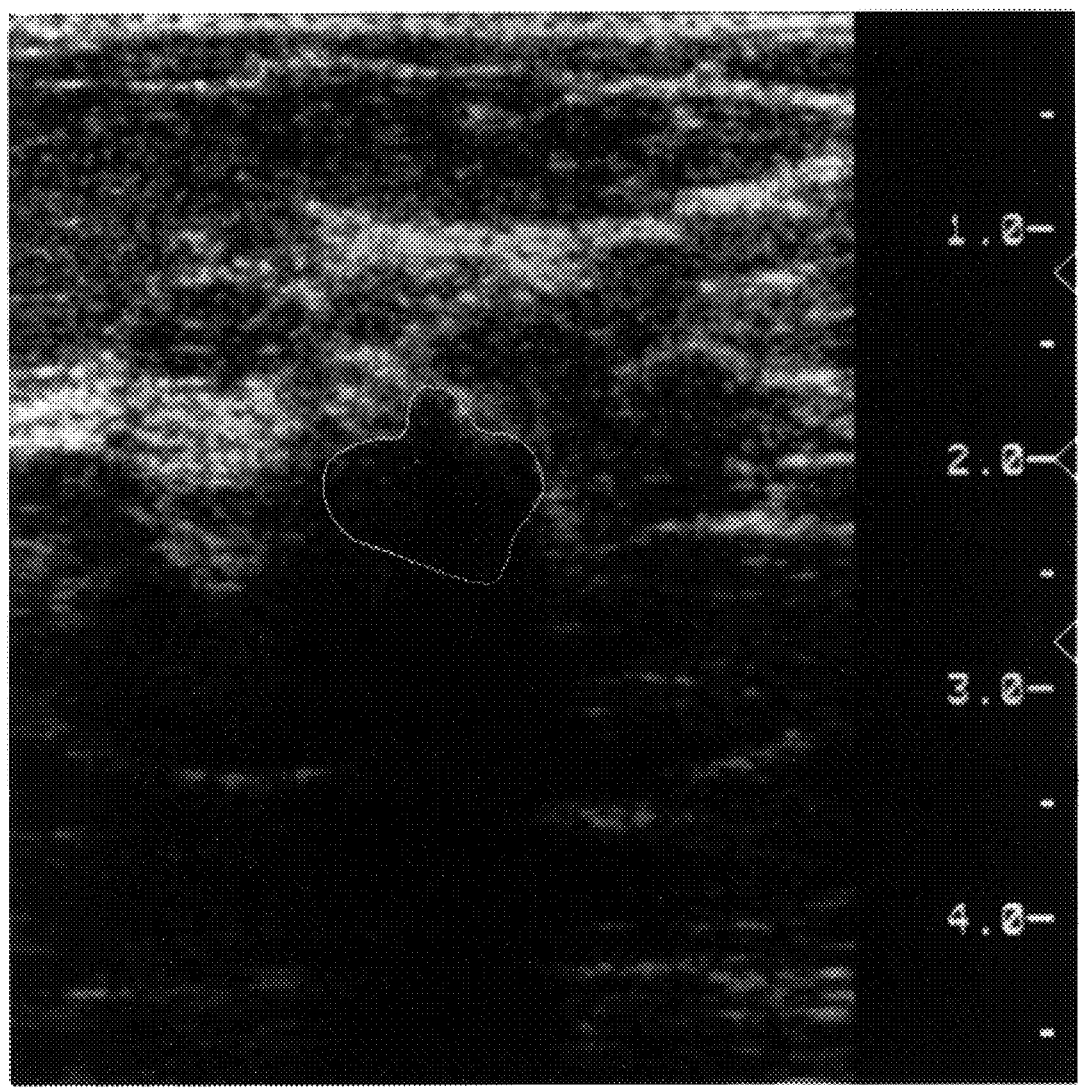
Figure 1C:
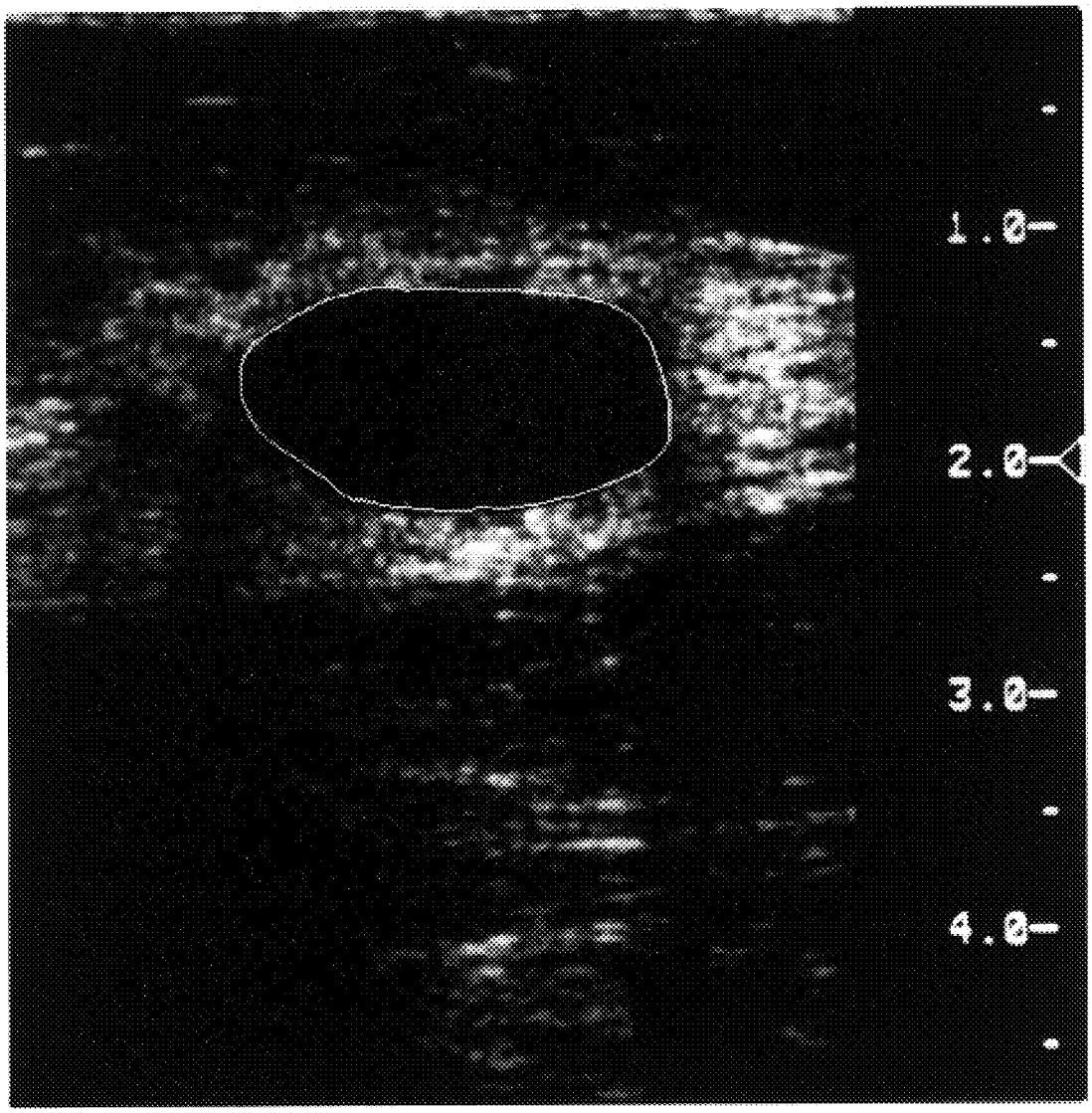
Figure 1D:
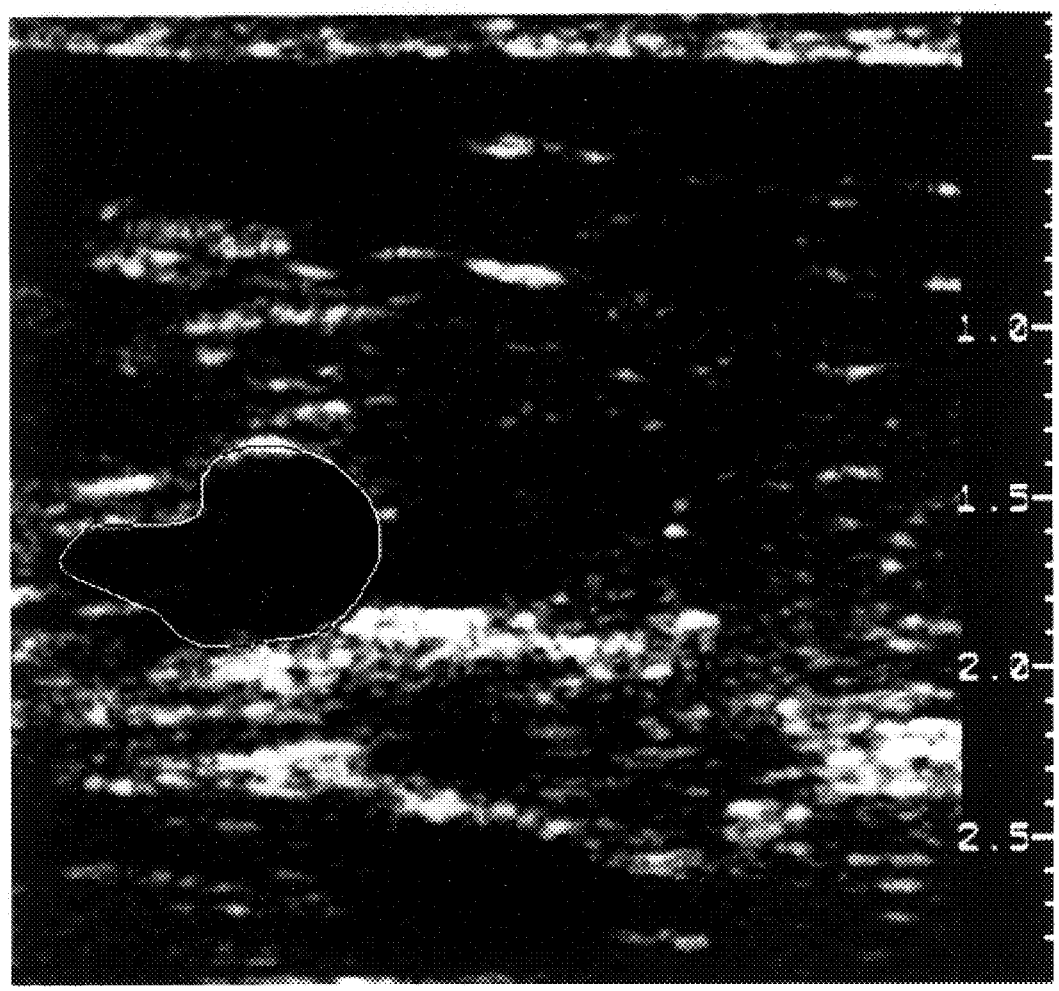
Figure 1E:
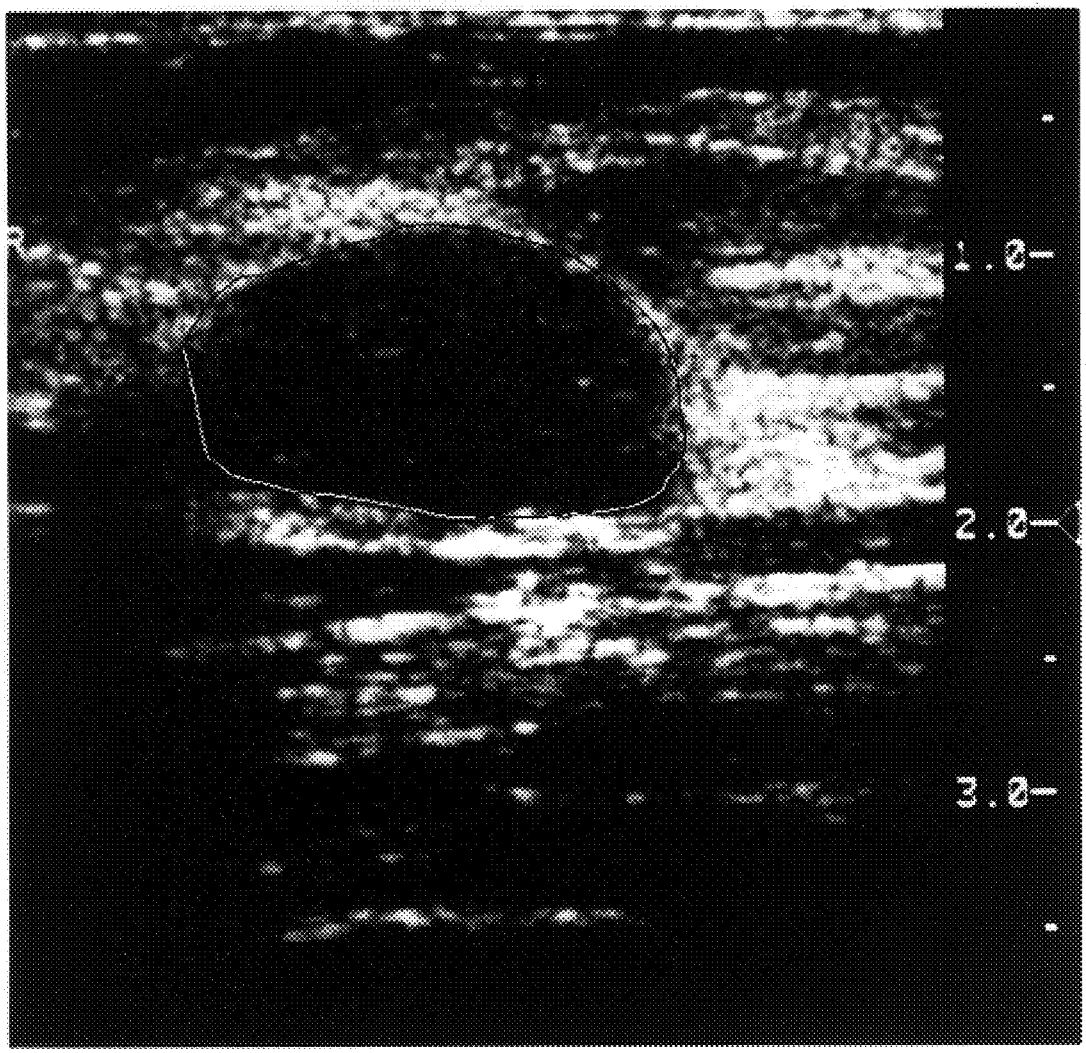

Referring now to the drawings, and more particularly to FIG. 1a thereof, a schematic diagram of the automated method 100 for the analysis and characterization of lesions in ultrasound images. The method 100 includes an initial image acquisition step 102 of an ultrasound image and presentation of the image in digital format, preferably a gray-scale format. Next, in step 104 the method 100 includes determination of an initial location of the lesion. This can be accomplished manually or automated by computer. Then in steps $106_1$, $106_2$ and $106_3$ the lesion is extracted from the location of the lesion, followed by ROI placement within the lesion and about the lesion, respectively. This can be performed manually or by computer. Then, in feature extraction step 108, various features including gray-level based, gradient based, geometric based and/or texture based features are automatically extracted within and about the lesion of interest. Thereafter, in classifier step 110, which can be implemented by means of an artificial neural network of the type disclosed in one or more of the cross-referenced patents and patent applications above-identified, these features are merged in order to output a value that characterizes the lesion. In step 112, diagnosis is performed, i.e., an estimate of the likelihood that the lesion is cancerous and/or classification of a benign lesion type is given.

FIGS. 1b–1e illustrate typical images acquired in step 102. These images respectively include a malignant lesion, a simple cyst, a complex cyst, and a solid lesion.

Once the ultrasound examinations are performed, in step 102 the images in digital format are obtained either by using a laser film scanner to digitize ultrasound films or transferring directly from the digital ultrasound machine. After the radiographic images are in digital format, they can be subjected to digital analysis techniques such as image processing and feature extraction (step 104).

Classification in step 110 is based on the recognition that most simple cysts have smooth walls, sharp anterior and posterior margins, no internal echoes, and usually posterior enhancement. Most infiltrating carcinomas are irregular hypoechoic masses with posterior acoustical shadowing. Many fibroadenomas (benign solid masses) are oval, smooth, hypoechoic masses.

Figure 2:
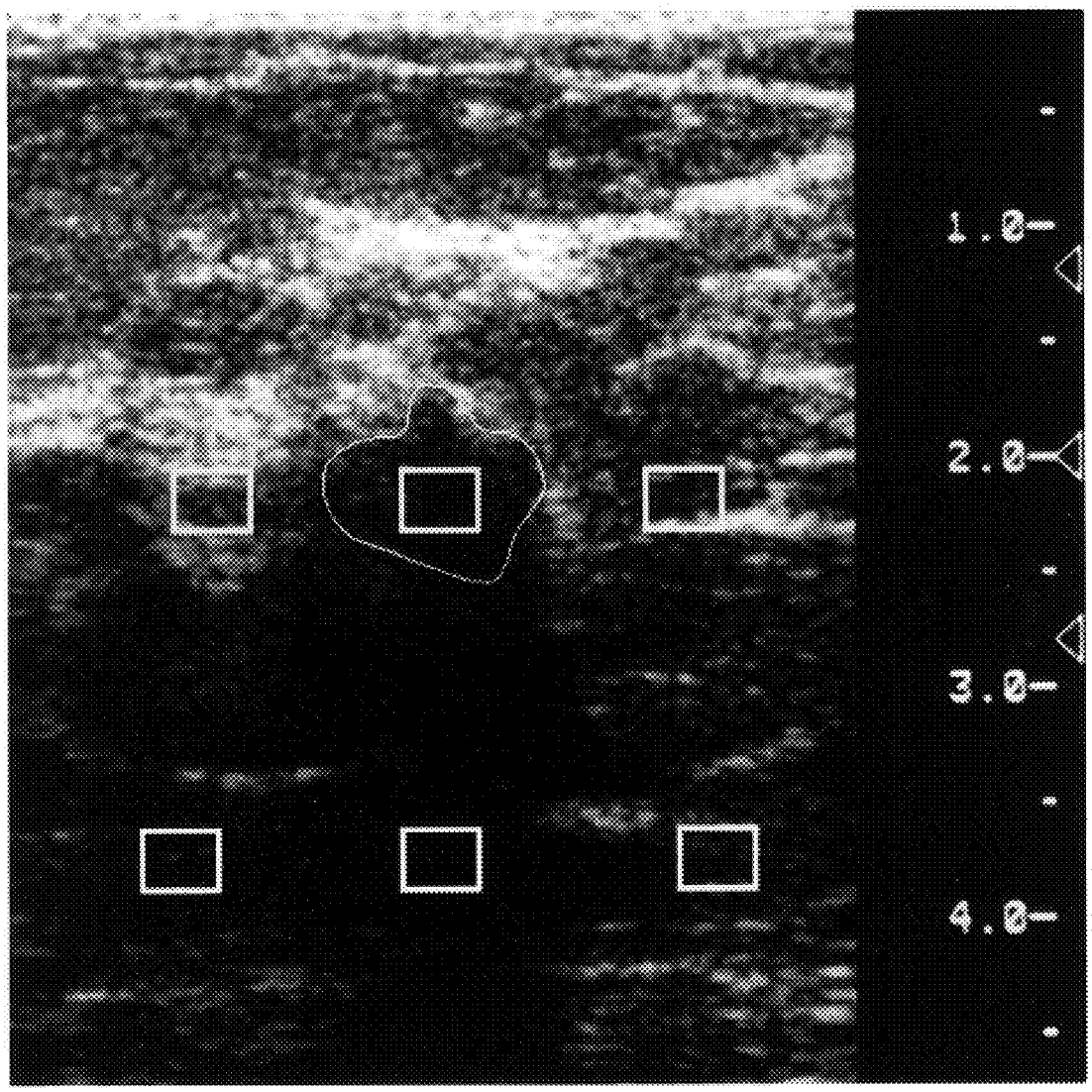
FIG. 2 is a sketch illustrating some of the potential placements of the ROIs within the ultrasound image in order to calculate the measures of echogenicity according to the present invention.
Figure 3:
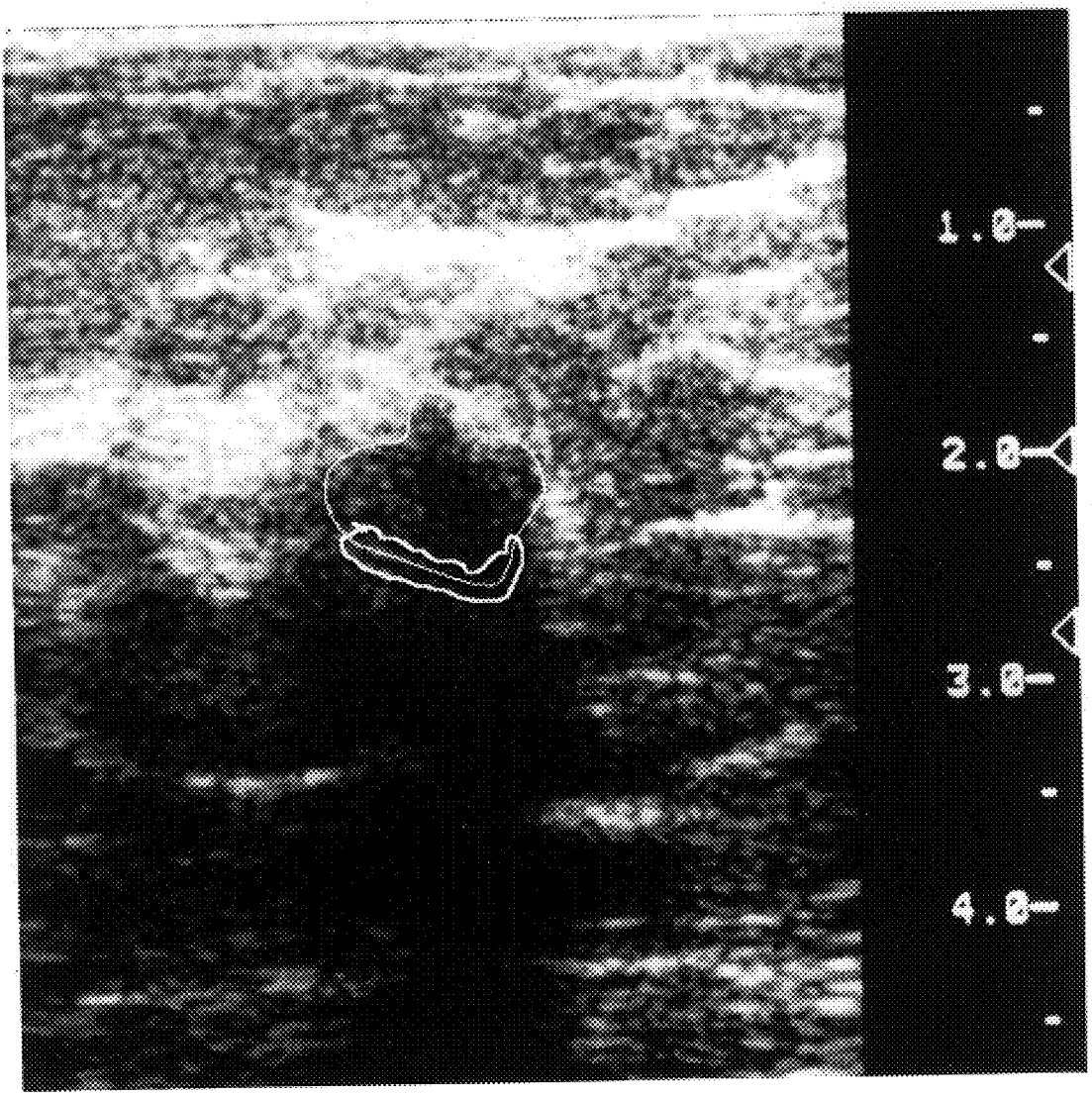
FIG. 3 is a sketch showing the region of interest along only the bottom portion of the lesion in question that is used in calculating characteristics of the margin.

Regions of interest (ROIs) are selected in step 104 from regions within and about the lesions, and will serve as the input to the computerized analysis scheme. FIG. 2 illustrates some of the potential positions of the ROIs. The computerized method includes the analysis of the texture within the lesion, the analysis of the margin of the lesion, and a comparison of the lesion with its surround. The margin can be analyzed along the margin or in a neighborhood about the margin. The margin can also be partially analyzed as illustrated in FIG. 3, which shows the region of interest along only the bottom portion of the lesion in question.

Various features are calculated by the computerized method. Some that are useful in distinguishing between benign and malignant lesions are listed below in the following Table 1:

TABLE 1

| | Benign (cystic and/or solid) | Malignant |
| --- | --- | --- |
| Texture within Lesion | anechoic hyperechoic reverberation artifacts | hypoechoic |
| Oradient along Lesion Margin | smooth borders spiculation | angular margins |
| Shape of Lesion | ellipsoid mildly lobulated | irregular depth:width > 0.8 |
| Acoustic "artifacts" | posterior enhancement | posterior shadowing |

Figure 4:
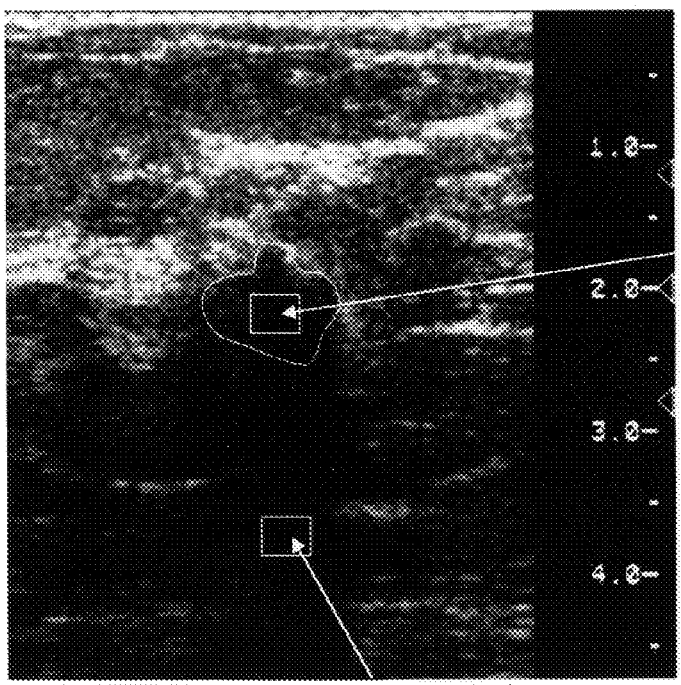
FIG. 4 is an illustration of regions of interest with an outlined lesion or deep to the lesion used in the calculation of the gray-level and texture features.

Within the lesion, gray-level features are calculated including the mean and standard (in homogeneity of the gray levels) deviation of the gray levels, as well as various features related to the histogram of gray levels with in the region of interest. Lesion contrast with respect to surrounding background can also be calculated. FIG. 4 illustrates that gray-level features and texture features can be calculated within a ROI within the lesion or within the outlined lesion. Also, as evident in FIG. 4, gray-level and texture features can be calculated in an ROI deep to the lesion. Cluster plots of features, as discussed hereinafter, within the lesion versus deep to the lesion can be used to distinguish between lesion type.

Gray-levels features include:
average gray level within a ROI or lesion;
standard deviation of the gray levels within a ROI or lesion;
minimum gray level within a ROI or lesion;
maximum gray level within a ROI or lesion;
minimum 5% gray level corresponding to the gray level below which yields 5% of the area under the gray-level histogram;
maximum 5% gray level corresponding to the gray level above which yields 5% of the area under the gray-level histogram; and contrast as given by the difference between gray levels within the lesion relative to those in the surround.

Texture is quantified by computing the 2-D Fourier transform of the gray levels within the lesion, referred to here as power spectrum. The region of interest is subjected to a texture analysis process that involves two measures: the root-mean-square (rms) variation (R) and the first moment of the filtered power spectrum (M), which represents the magnitude and coarseness of parechymal texture pattern, respectively. These measures are given by:

$$R = \sqrt{\int_{-\infty}^{\infty}\int_{-\infty}^{\infty} |F(u,v)|^\theta du\,dv}$$

$$M = \frac{\int_{-\infty}^{\infty}\int_{-\infty}^{\infty} \sqrt{u^\theta + v^\theta}\,|F(u,v)|^\theta du\,dv}{\int_{-\infty}^{\infty}\int_{-\infty}^{\infty} |F(u,v)|^\theta du\,dv}$$

where F(u,v) corresponds to the Fourier transform of the ultrasound pattern, respectively, within the ROI. Higher moments of the power spectra can also be calculated. Higher moments are not conceptualized visually as easily as the rms variation and first moment values, however.

The Fourier measures are also calculated as a function of angle in the Fourier domain. The angular dependence of the two measures (R and F) are examined by dividing the power spectrum into several sectors and performing the summations within each sector, yielding $R(\theta)$ and $F(\theta)$, where $\theta$ is the angular interval used in segmenting the spectrum. Directionality features are listed below including:

$A_{RMS}$=average over all $R(\theta)$
$RMS_{MAX}$=maximum of $R(\theta)$
$RMS_{MIN}$=minimum of $R(\theta)$
$D_{RMS}$=$RMS_{MAX}$−$RMS_{MIN}$
$R_{RMS}$=$RMS_{MAX}$/$RMS_{MIN}$
$SD_{RMS}$=standard deviation of $R(\theta)$
$SA_{RMS}$=$SD_{RMS}$/$A_{RMS}$
and
$A_{FMP}$=average over all $F(\theta)$
$FMP_{MAX}$=maximum of $F(\theta)$
$FMP_{MIN}$=minimum of $F(\theta)$
$D_{FMP}$=$FMP_{MAX}$−$FMP_{MIN}$
$R_{FMP}$=$FMP_{MAX}$/$FMP_{MIN}$
$SD_{FMP}$=standard deviation of $F(\theta)$
$SAFMP$=$SD_{FMP}$/$A_{FMP}$ These directionality measures may limited use in ultrasound images due to the inherent directionality perpendicular to the ultrasound beam.

Texture within ROIs or the lesion itself is also calculated using fractal analysis. The fractal dimension is estimated using a surface area technique, modified from one described for the computerized analysis of mammograms [51]. The gray level of each pixel is regarded as a "height" with pixel size as "length" and "width" to calculate a "surface area" for each ROI. Adjacent pixels are combined to yield an effectively larger pixel size with a new gray level averaged from these combined pixels. A new "surface area" is then calculated for each ROI, and the process is successively repeated, combining adjacent pixels from earlier steps, and calculating the resultant surface area for each new effective pixel size. The fractal dimension (D) for each ROI is calculated, using:

$$D = 2 - H$$

where H is the slope of a least-squares line fitted to a plot of log surface area versus log pixel size for each ROI. The number 2 is the topological dimension of the gray level surface. If the plot yields more than one slope, the texture is considered to be multi-fractal and the fractal dimension for each segment is calculated.

Figure 5A:
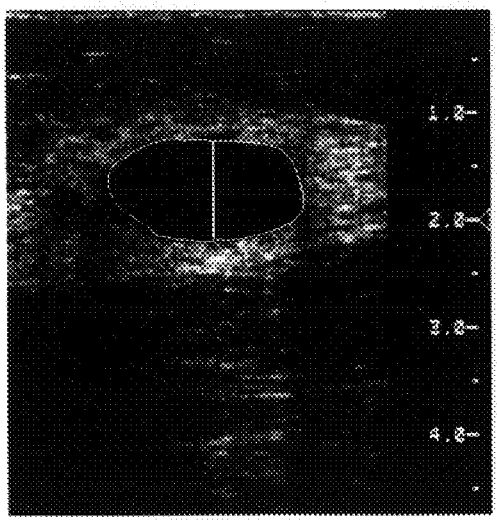
FIG. 5 is an illustration of depth and width of a lesion used in the calculation of the geometric measures such as shape and orientation.
Figure 5B:
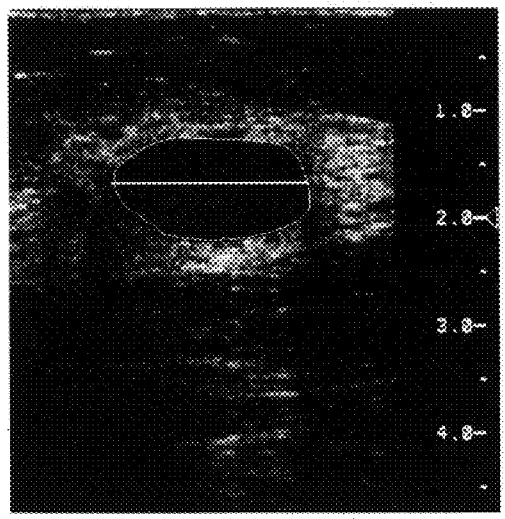

FIG. 5 illustrates methods for the calculation of the geometric measures. From the margin, shape of each lesion, in terms of its long-to-short axes ratio, is determined. Note here that the long-to-short axes ratio is calculated as depth-to-width ratio in order to extract out the orientation of the long axis. Cysts tend to be elipsoid resulting in a depth-to-width ratio of much less than one, whereas malignant lesions tend to have a depth-to-width ratio of approximately equal to or greater than 1.0.

Circularity and irregularity are computed by geometry-related equations that quantify how well the lesion conforms to a circular shape, and how irregular the area is distributed over space.

Figure 6:
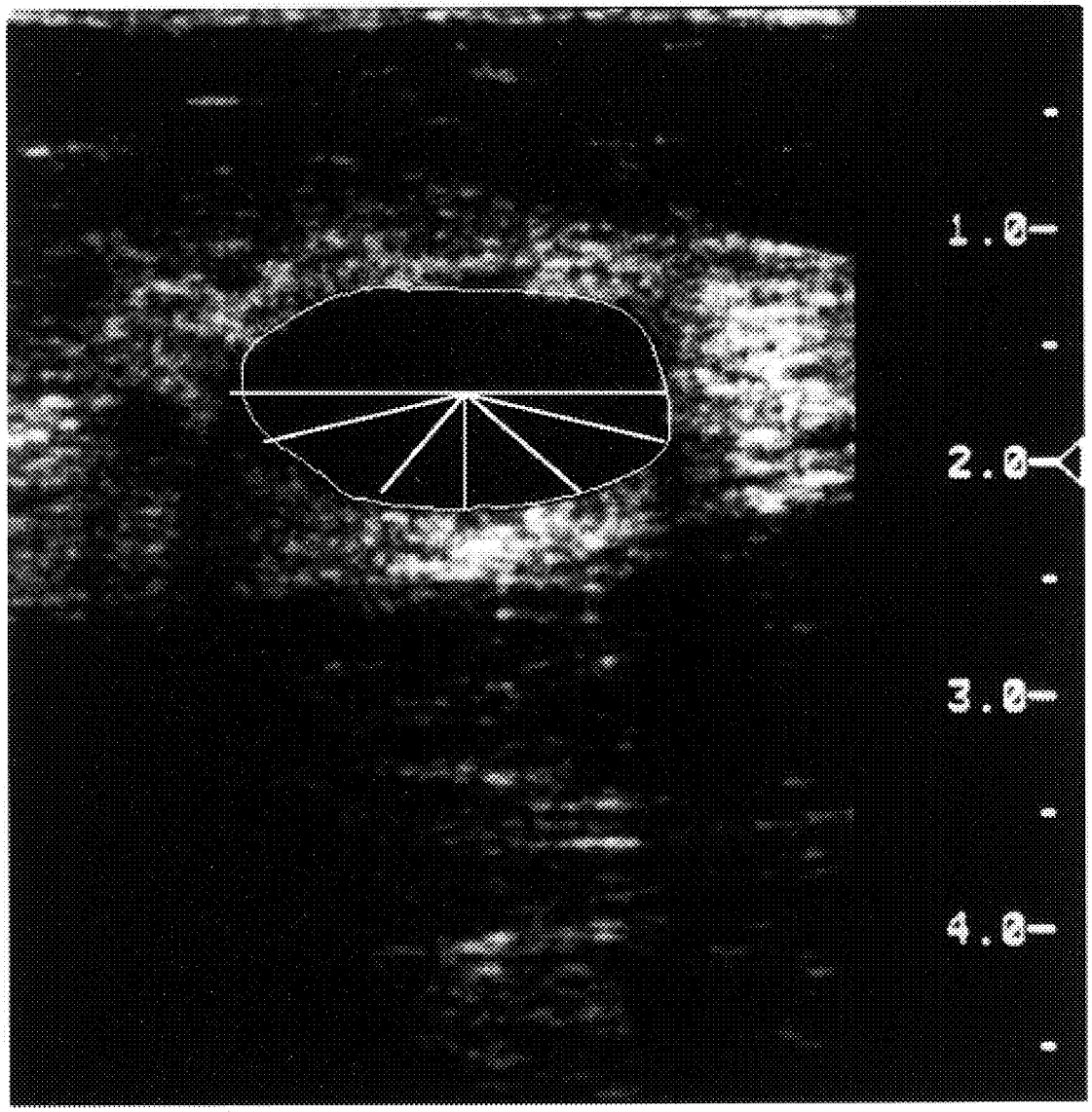
FIG. 6 is an illustration of radial directions in a lesion for calculating the normalized radial gradient along the deep margin of the lesion for directional analysis.

Directional analysis (FIG. 6) of the gradients in the lesion and along the margin of the lesion can be performed.

In the gradient analysis, the region is first processed by a Sobel filter in order to obtain the gradient and direction at each pixel in the ROI. Next, the gradient histogram and the weighted gradient histogram are calculated. The gradient histogram gives the frequency distribution of the pixels as a function of the direction of the maximum gradient, where each pixel is equally weighted in terms of its contribution to the histogram. The weighted gradient histogram includes the magnitude of the gradient as a weight and thus the contribution of each pixel to the histogram is weighted by its magnitude. Each of these distributions are fitted with a 9th order polynomial and features are calculated from the fitted distributions. These features include:

average value of the gradient-weighted histogram;
standard deviation of the gradient-weighted histogram;
angle where peak of gradient-weighted histogram occurs;
average angle of gradient-weighted histogram; and
full width at half maximum of the gradient-weighted histogram.

Directional analysis of the gradients in the lesion is aimed at quantifying how uniform the lesion extends along radial lines from a point in the center. This type of analysis shall be referred to here as radial gradient analysis. These features involve determining the magnitude of the gradient for a pixel in the radial direction, as shown below, with normalization.

$$RG = \frac{\sum_{P \in L} \cos\phi \sqrt{D_x^2 + D_y^2}}{\sum_{P \in L} \sqrt{D_x^2 + D_y^2}}$$

RG radial gradient index $-1 \leq RG \leq 1$
P image point
L detected lesion excluding the center part
Dx gradient in x-direction
Dy gradient in y-direction
$\phi$ angle between gradient vector and connectionline from center point to neighbour point The radial gradient analysis features include:
normalized radial gradient (RG) along the entire margin of the lesion;
normalized radial gradient (RG) along only the posterior margin of the lesion (as illustrated earlier in FIG. 3);
normalized radial gradient (RG) along only the lateral margins of the lesion;
normalized radial gradient (RG) within a small neighborhood along the entire margin of the lesion;
normalized radial gradient (RG) within a small neighborhood along only the posterior margin of the lesion; and
normalized radial gradient (RG) within a small neighborhood along only the lateral margins of the lesion.

In mammograms, it has been observed that the gradients in benign masses extend more uniform along radial lines than in malignant lesions.

Figure 7A:
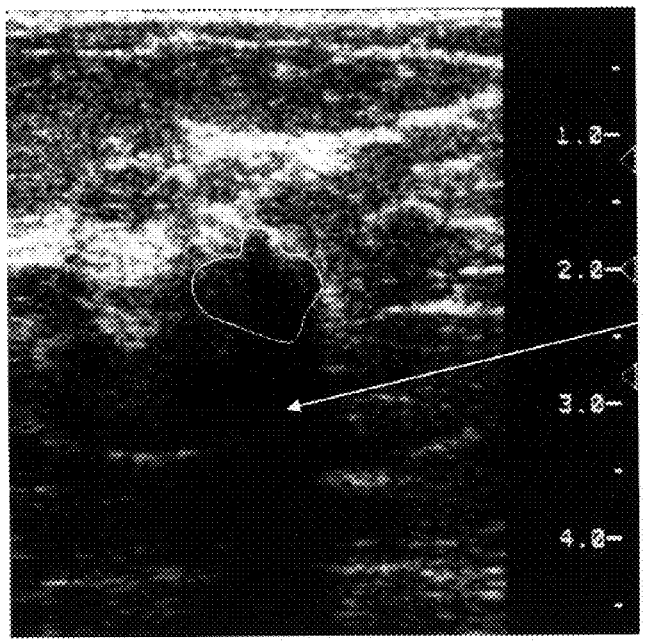
FIGS. 7a and 7b are illustrations of a malignant lesion and a benign cyst and provide a comparison beyond the lesion for posterior shadowing and posterior enhancement when the average gray level within an ROI is used.
Figure 7B:
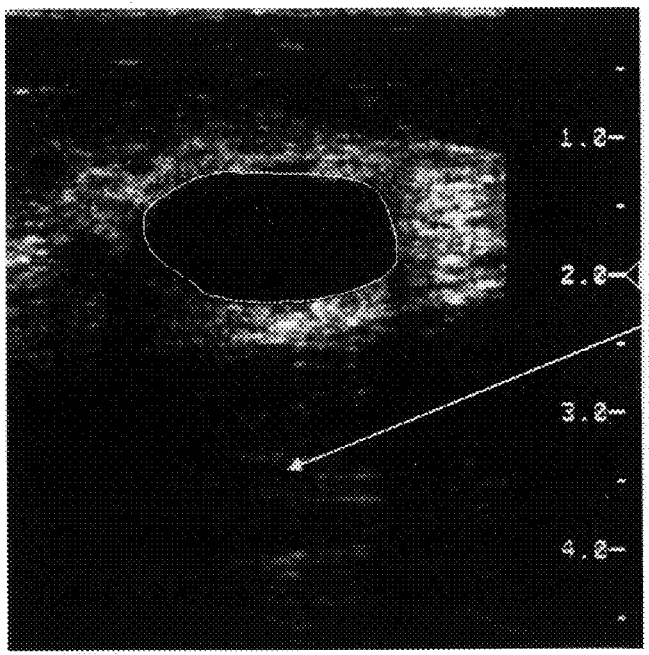

Other measures of echogenicity include the computerized assessment of acoustic "artifacts" that different lesions cause. Comparison of the "density" and the texture patterns of the lesion with neighboring regions, including those deep to the lesion, is performed in order to quantify its echogenicity and the amount of any posterior acoustic shadowing or enhancement. For example, benign lesions cause posterior enhancement while malignant lesions tend to cause posterior shadowing. For example, simple cysts will cause less attenuation of the ultrasound waves and produce little echoes, and thus cause enhancement deep to the lesion. These shadowing and enhancement features are determined by a computer scheme that extracts the spatial features discussed above within the lesion as well as beyond the lesion and along side of the lesion as demonstrated by the regions of interests in FIG. 2. FIGS. 7a and 7b illustrate a comparison beyond the lesion for posterior shadowing and posterior enhancement when the average gray level within an ROI is used. Other extracted features, such as gradient and texture based features, can also be used in such a comparison in which the particular feature is compared within the lesion to beyond the lesion.

In addition, the amount of shadowing and enhancement can be determined by examining profiles through the lesion as demonstrated in FIGS. 8a and 8b. The profiles obtained across the lesion and obtained below the lesion can be analyzed separately or a difference profile can be obtained. The standard deviation of the difference profile can be used as a feature to distinguish benign from malignant lesions.

Figure 9A:
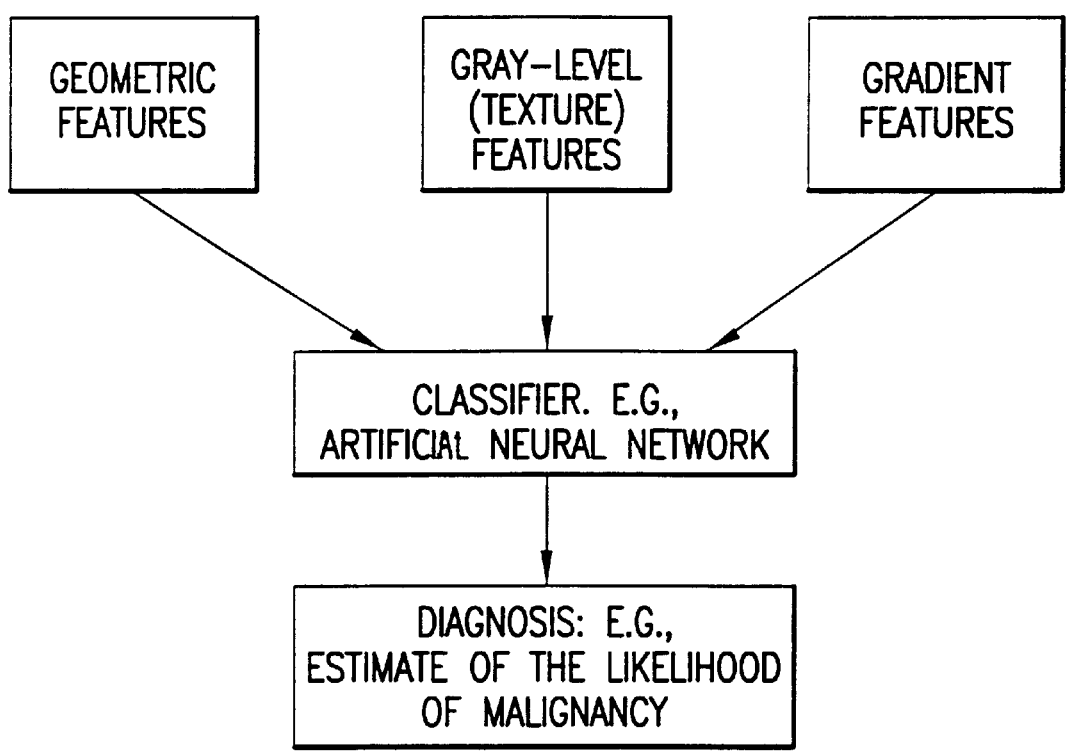
FIG. 9a is a sketch illustrating the method according to the present invention, after feature extraction, for the merging of the various features into an estimate of malignancy in the classification step.
Figure 9B:
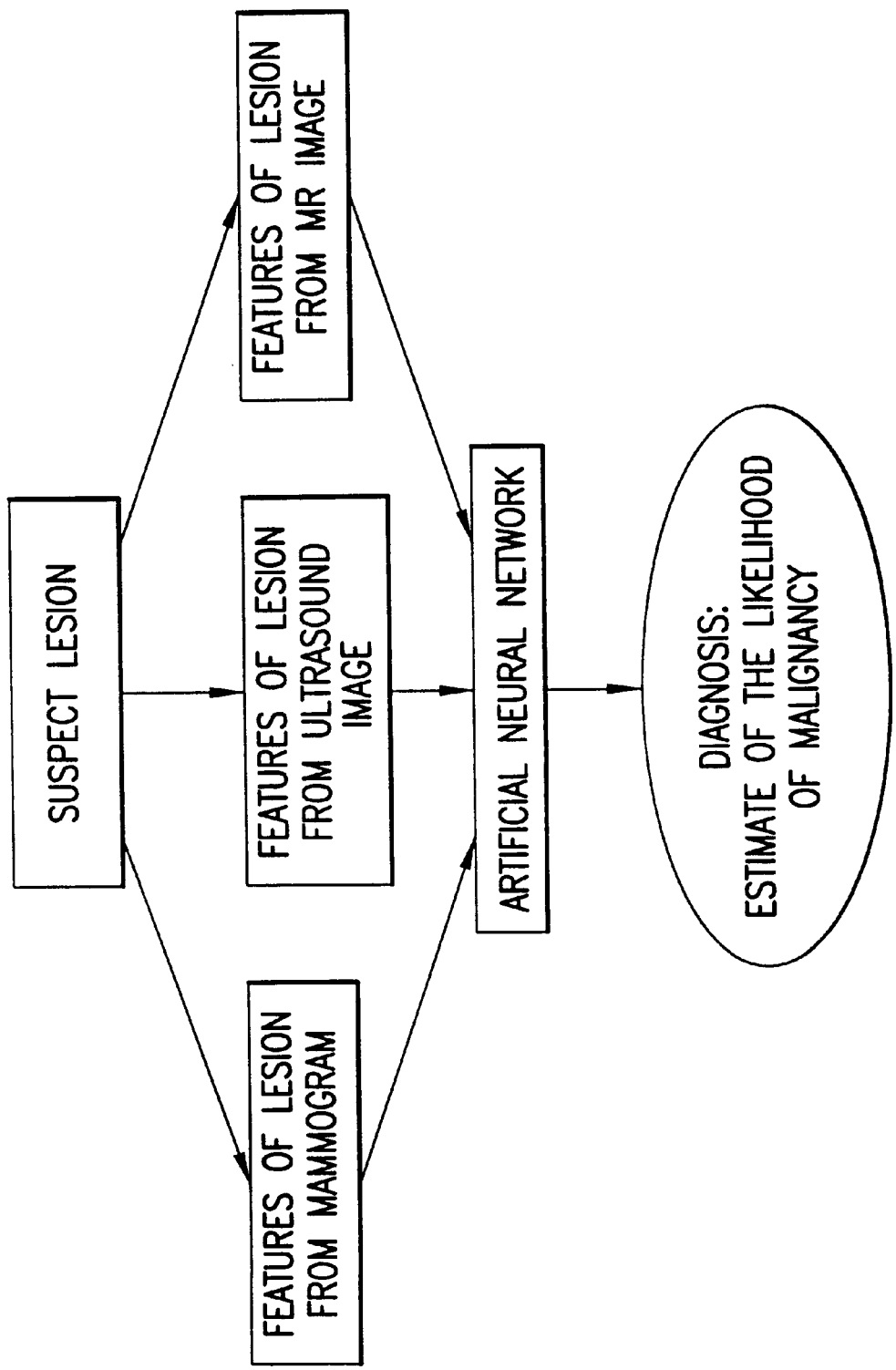
FIG. 9b is a sketch illustrating the method according to the present invention, after feature extraction from images obtained by plural modalities, for merging features obtained from the different modalities, such as x-ray mammography, magnetic resonance imaging, and ultrasound imaging into an estimate of malignancy in the classification step.

After feature extraction (step 108), the various features are merged into an estimate of malignancy in the classification step 110. Artificial neural networks, analytic classifiers as well as rule-based methods can be applied for this purpose, as schematically shown in FIG. 9a. The output from the neural network or other classifier can be used in making a diagnosis and/or prognosis. For example, with the analysis of the ultrasound images of the breast the features can be used to either distinguish between malignant and benign lesions, or distinguish between (i.e., diagnosis) the types of benign lesions such as benign solid lesions (e.g., fibroadenoma), simple cysts, complex cysts, and benign cysts. It should be noted also that the ultrasound image features can be merged with those from mammographic images of the same lesion. Further, as shown in FIG. 9b feature extraction can be performed on images produced using various modalities, including x-ray mammography $108_1$, magnetic resonance $108_2$, etc., as well as ultrasound 108. In other words, feature extraction can be performed on images derived from one or more modalities and extracted features merged for classification in a common ANN, as shown in FIG. 9b.

Figure 10A:
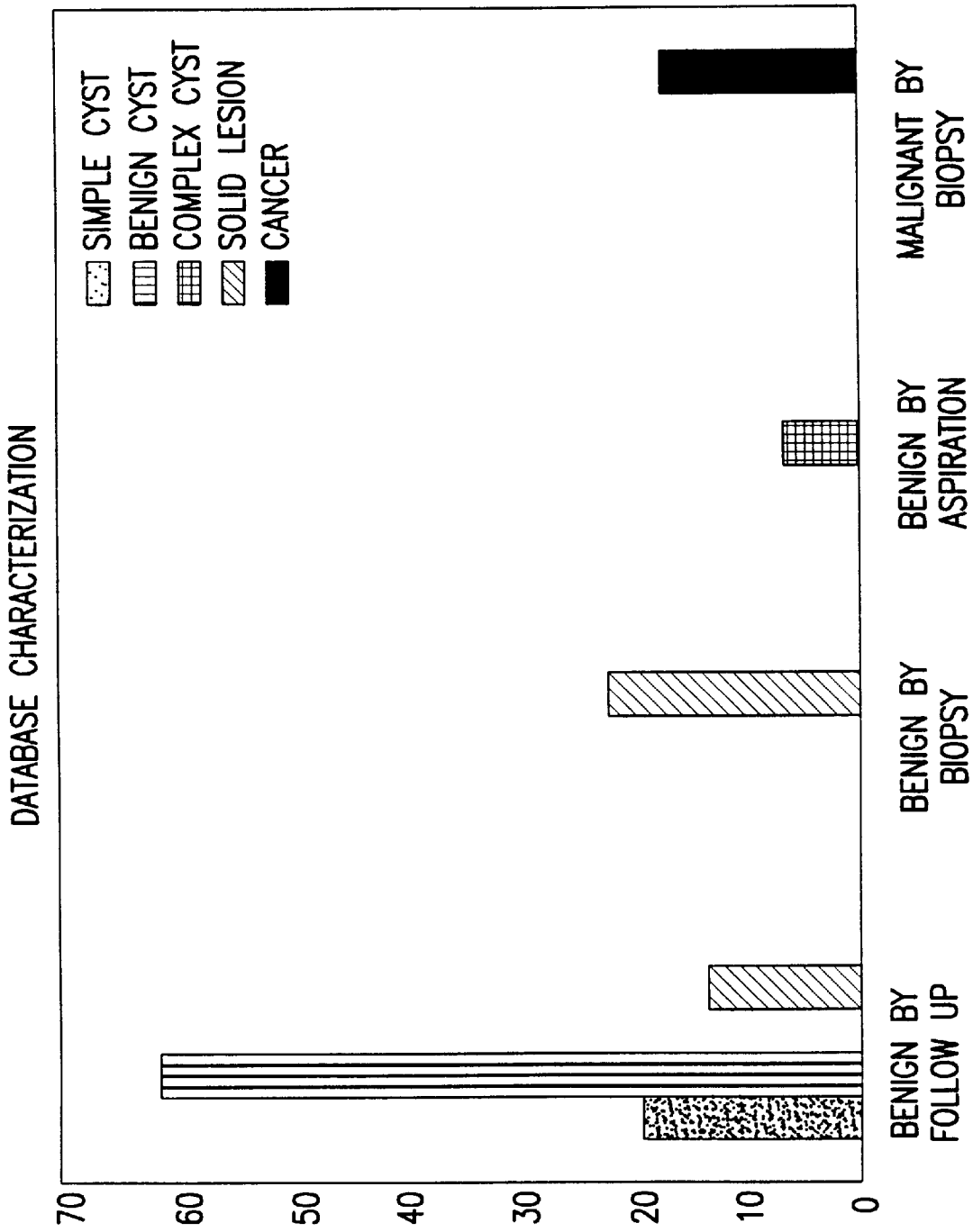
FIG. 10 is a chart illustrating the distribution of the types of lesions in the database with respect to the type of conventional mode (method of confirmation of pathological state) used in making the final differential diagnosis.
Figure 10B:
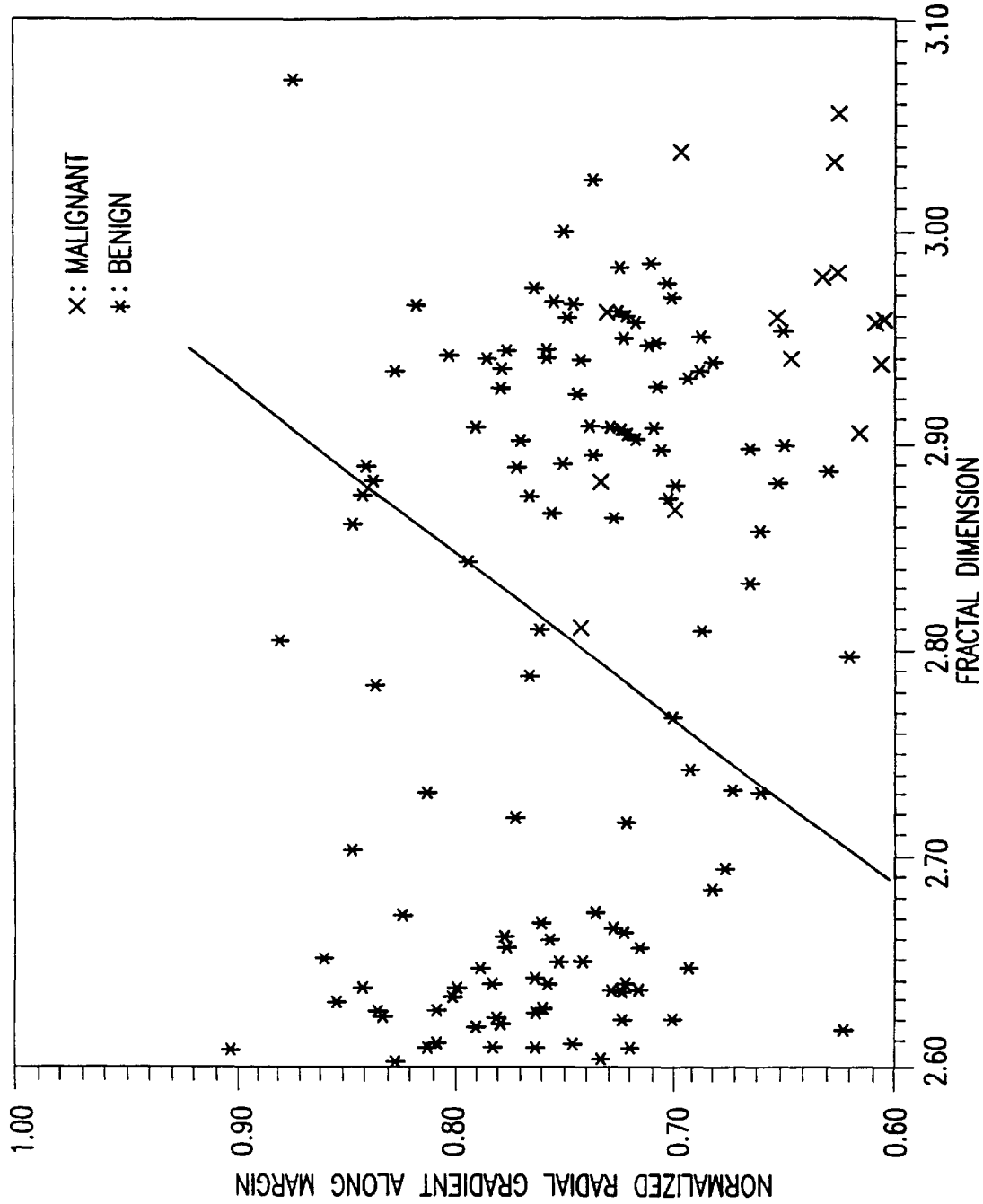

The performance of some of the features were examined in a preliminary study. In this study, 138 ultrasound images (0.1 mm film pixel size) from 39 patients were used, including 122 images from 33 patients with benign lesions and 16 images from 6 patients with malignant lesions. Benign lesions were confirmed by biopsy, aspiration, or follow-up while malignant lesions were confirmed by biopsy. Benign lesions include simple cysts, benign cysts, complex cysts, and solid lesions. FIG. 10a illustrates the distribution of the types of lesions in the database with respect to the type of conventional mode (method of confirmation of pathological state) used in making the final differential diagnosis. FIGS. 10a and 10b illustrate cluster plots used to determine how extracted features distinguish between lesions. For example, FIG. 10b illustrates the ability of two of the features to distinguish between malignant and benign lesions. Many benign lesions have a high normalized radial gradient. Note that a substantial number of benign lesions lie to the left of the solid line indicating that these features perform well in separating out some benign lesions and thus preventing such lesion from going on to biopsy. Also note that it is important that no malignant lesion lie to the left of the discriminating line since the loss of a cancer is more costly than sending a benign case to biopsy.

Figure 10C:
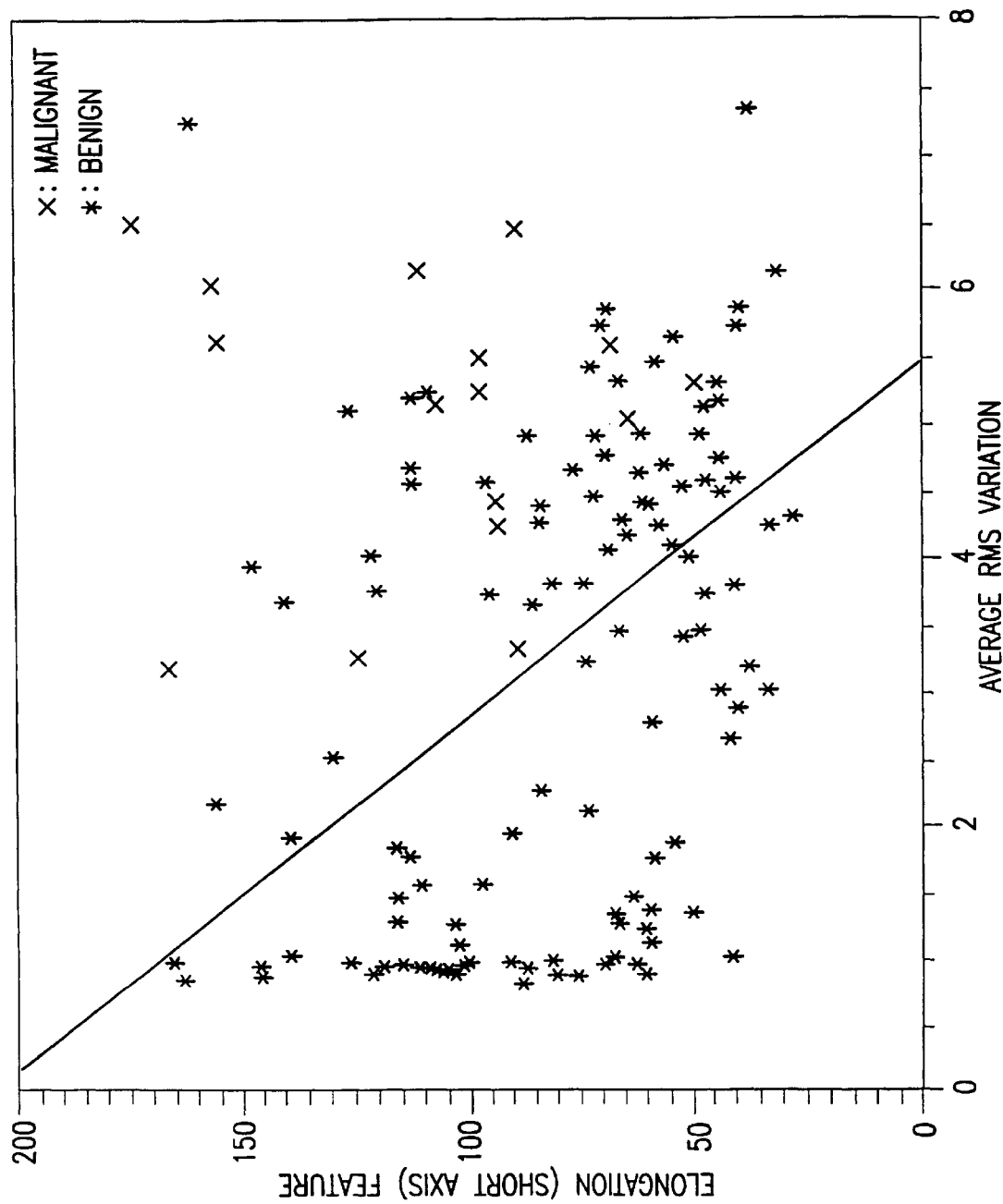

FIG. 10c likewise shows the performance of two other features in distinguishing between malignant and benign lesions. Note here that many benign lesions have a low average RMS variation, corresponding to the texture within the lesion.

Performance can be quantified using ROC analysis in which the area under the ROC curve (Az) serves as an index of performance with an Az of 1.0 being the ideal performance. The performance of various features in distinguishing between malignant and benign or between different types of benign lesions is given hereinafter.

FIGS. 11–14 illustrate the performances of the features. The performance of some of the features ROC analysis was used to evaluate the performance of the various features in distinguishing benign from malignant lesions. The features were examined for their ability to distinguish between malignant and benign lesions, between different types of benign lesions, and between lesions that underwent different workups (e.g., lesions being diagnosed by biopsy vs. those by aspiration vs. those by just visual ultrasound assessment).

FIG. 11 gives the Az values for the various computer-extracted features on the database of 44 ultrasound images (16 malignant, 28 benign by biopsy or aspiration). Az is the area under the ROC curve in the task of distinguishing between malignant and benign lesions.

Figure 12:
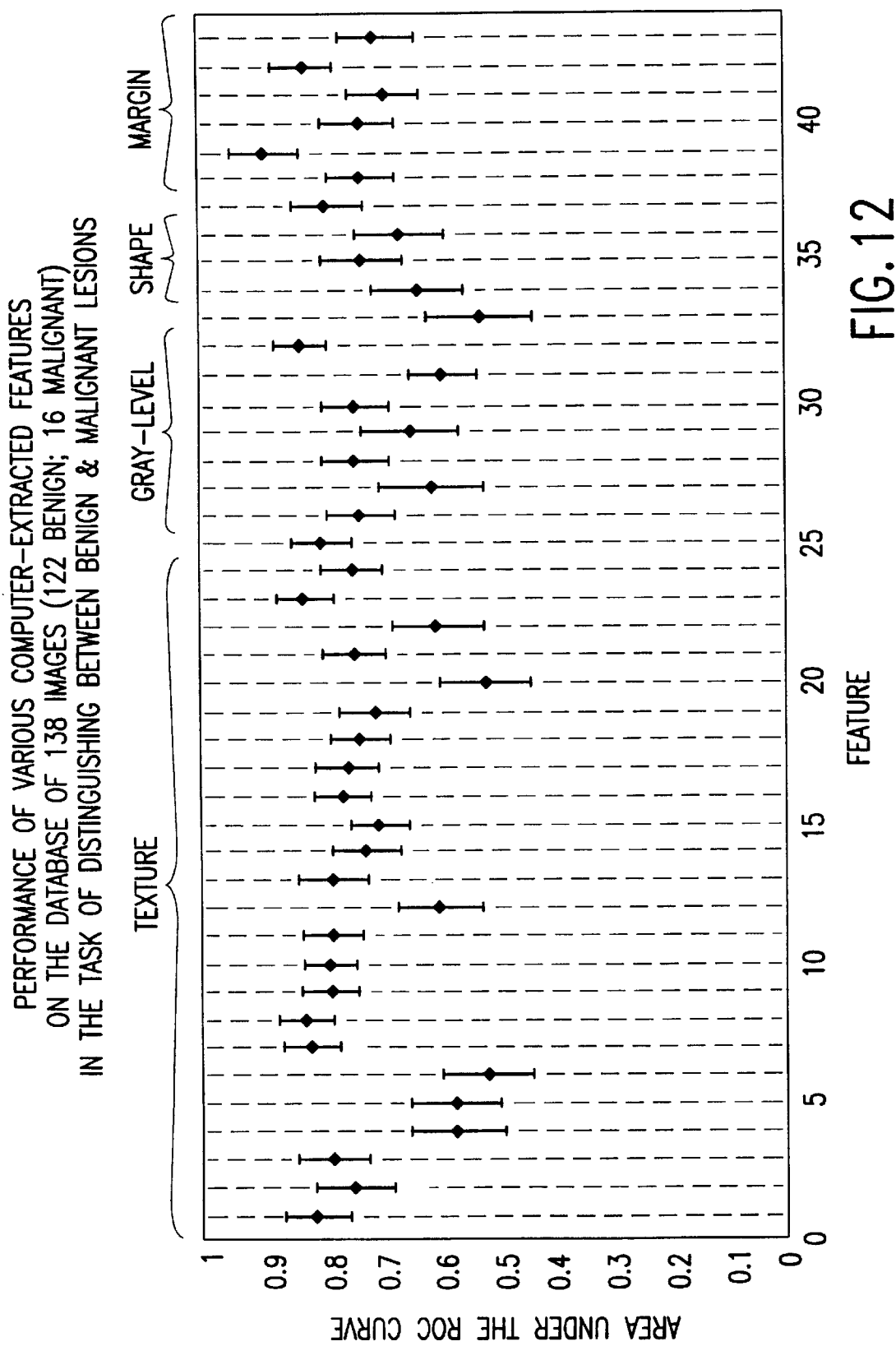
FIG. 12 is a chart illustrating the Az values for the various computer-extracted features on the database of 138 ultrasound images (16 malignant, 122 benign by biopsy, aspiration, or follow-up)

FIG. 12 gives the Az values for the various computer-extracted features on the database of 138 ultrasound images (16 malignant, 122 benign by biopsy, aspiration, or follow-up). Az is the area under the ROC curve in the task of distinguishing between malignant and benign lesions.

Figure 13:
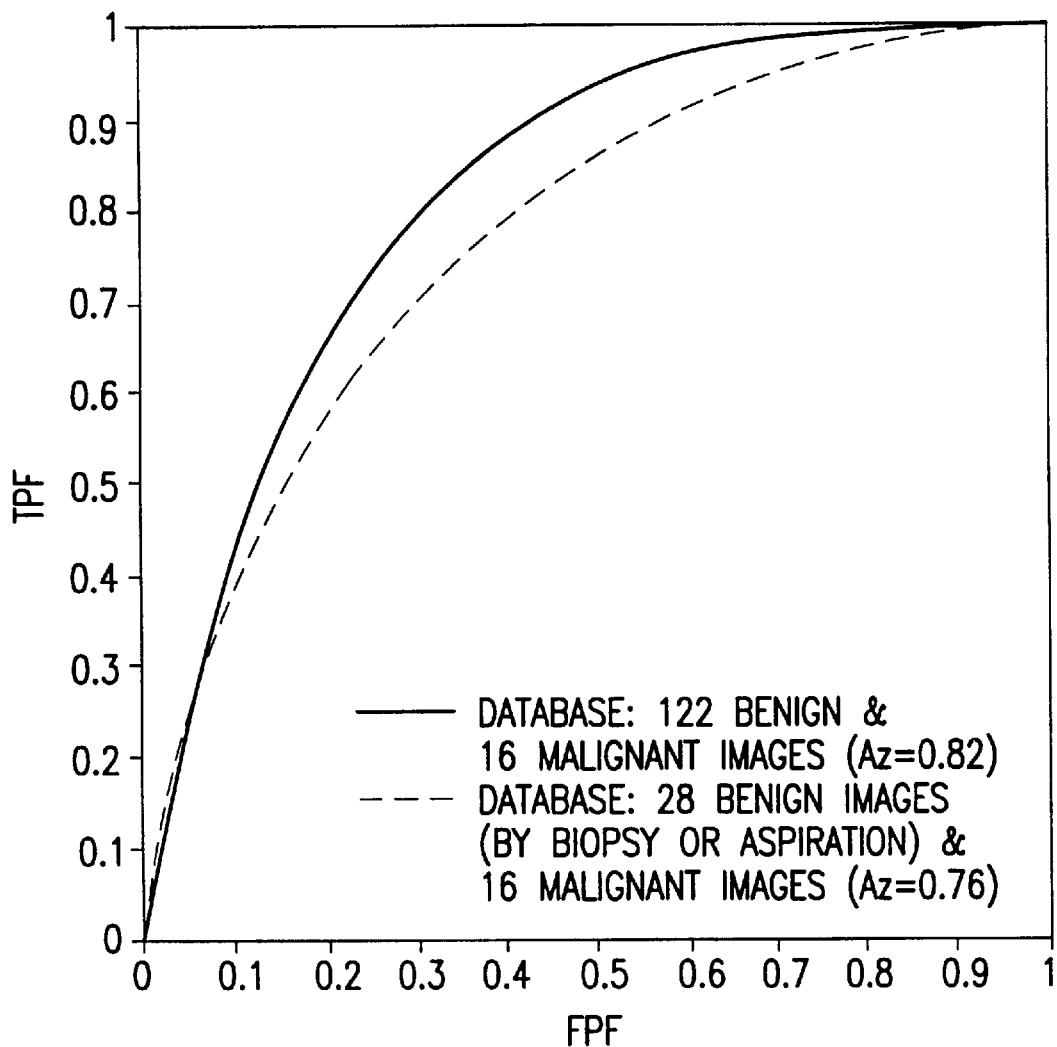
FIG. 13 is a graph of ROC curves indicating the performance of a texture measure in distinguishing between malignant and benign lesions in the entire database of 138 images, and between malignant and benign lesions that had been sent to biospy (database of 44 images)

FIG. 13 shows ROC curves indicating the performance of a texture measure in distinguishing between malignant and benign lesions in the entire database of 138 images, and between malignant and benign lesions that had been sent to biospy (database of 44 images). Noting the shape of the ROC curve is important in that it indicates that some benign lesions can be identified as benign without the loss of malignant lesions.

Figure 14:
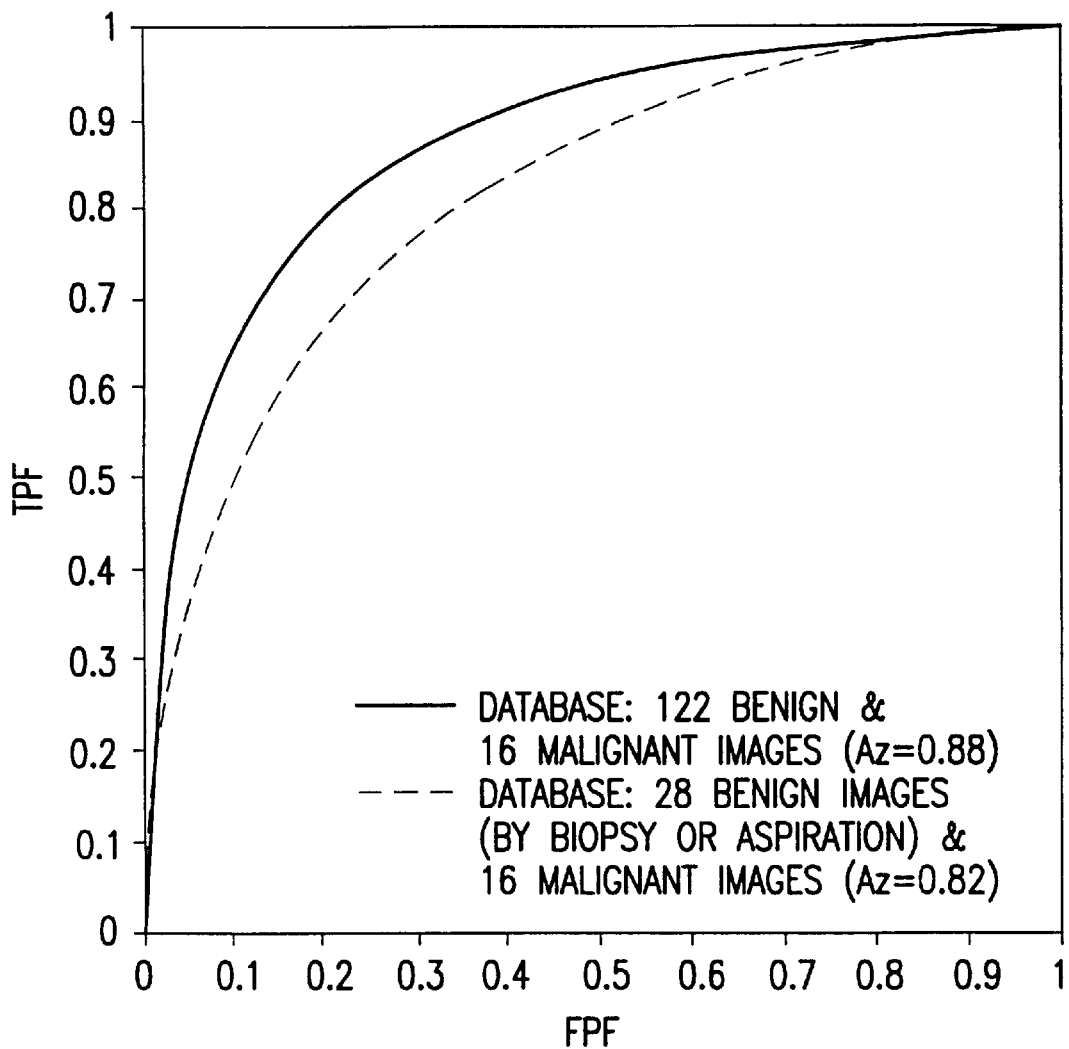
FIG. 14 is a graph ROC curves indicating the performance of a margin measure in distinguishing between malignant and benign lesions in the entire database of 138 images, and between malignant and benign lesions that had been sent to biospy (database of 44 images)

FIG. 14 shows ROC curves indicating the performance of a margin measure in distinguishing between malignant and benign lesions in the entire database of 138 images, and between malignant and benign lesions that had been sent to biospy (database of 44 images). Noting the shape of the ROC curve is important in that it indicates that some benign lesions can be identified as benign without the loss of malignant lesions.

Table 2 below gives the performances of some of the features in the differential diagnosis of various lesions besides distinguishing between malignant and benign lesions:

TABLE 2

Performance of features in terms of Az

|  | fractal dimension | contrast | gradient along margin |
| --- | --- | --- | --- |
| malignant vs. benign | 0.82 | 0.82 | 0.88 |
| simple vs. complex cyst | 0.68 | 0.71 | 0.78 |
| simple cyst vs. solid lesion | 0.77 | 0.76 | 0.89 |
| complex cyst vs. solid lesion | 0.72 | 0.61 | — |
| all cysts vs. solid lesion | 0.80 | 0.80 | 0.71 |
| simple cyst vs. malignant | 0.85 | 0.85 | — |
| complex cyst vs. malignant | 0.84 | 0.79 | 0.83 |
| all cysts vs. malignant | 0.87 | 0.89 | 0.90 |
| solid lesion vs. malignant | 0.68 | 0.64 | 0.33 |

These features can be merged with a classifer such as an artificial neural network, as was shown in FIG. 9a. Note that the output could be the likelihood of malignancy or an indicator of the type of benign lesion. The table above shows support for use of such classifiers since some features are better in distinguishing between (for example) simple cysts and malignant lesions while other features are better in distinguishing between (for example) solid benign lesions and malignant lesions.

Likewise, FIG. 9b illustrates a method for merging features from magnetic resonance, mammographic and ultrasound images in order to exloit the capabilities of feature extraction and classification characteristic of different modalities.

In particular, mammograms yield high spatial resolution images containing information on the structure of the lesion. Information on the spiculation and margin sharpness of the lesion can be extracted by extracting the lesion structure or by analysis (such as gradient analysis) of the immediate surround of a roughly-extracted lesion. In addition, the denseness of a lesion can be obtained from the amount of attenuation by the x-ray beam relative to the surround.

Ultrasound images of the breast yield information on the interior of the lesion (echonicity) as well as the interface between the lesion and its surround. Thus ultrasound is useful in distinguishing between solid lesions and fluid-filled lesions. Gradient analysis of the margins yields information on the interface between the lesion and the surround. Geometric measures relating the depth to the width of the lesion is useful in that although some lesions may be ellipsoid, the orientation of the ellipse is important in distinguishing among lesions. In addition, such features are useful in discriminating between solid benign lesions (such as a fibroadenoma) and a malignant lesion, when both may contain similar interior echonicity textures. Computerized analysis also allows for the objective assessment of posterior shadowing and posterior enhancement which aids in distinguishing between complex cysts and malignant lesions.

Magnetic resonance (MR) images of the breast can be analyzed to yield both structural and functional information of the lesion. By use of contrast medium, temporal information on the uptake by the lesion can be obtained yielding information on the vascularity of the lesion. Malignant lesions exhibit different amounts and patterns of vascularity than do benign lesions. Thus, in order to obtain maximum discriminating abilities, the merging of features from more than one modality is expected to improve the classification and characterization of lesions, and thus improve methods of diagnosis and assessing prognosis.

While features from mammographic images of lesions (for example) may better characterize spiculation, features from ultrasound may better describe the interior of the lesion in terms of echogenicity properties (as described by the earlier presented features).

Figure 15:
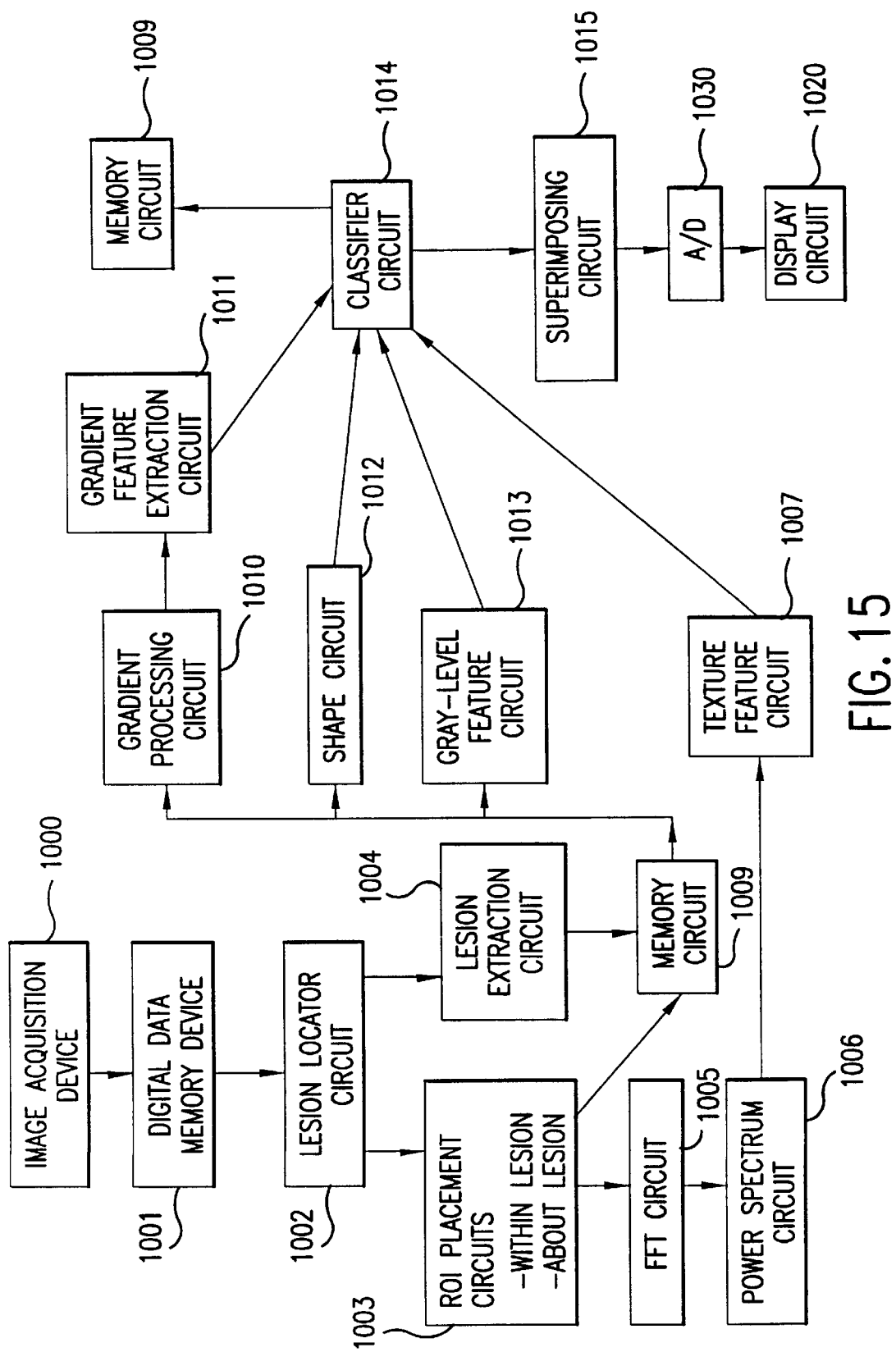
FIG. 15 is a functional block diagram of a system for implementing the method of the invention for the analysis of ultrasound images.

FIG. 15 is a more detailed schematic block diagram illustrating a system for implementing the method of the invention for the analysis of ultrasound images. Referring to FIG. 15, ultrasound images of an object are obtained from an image acquisition device and input to the system 1000. Each image is digitized and put into memory (1001). If the image is obtained with a direct digital device then there is no need for digitization. The image data is first passed through the lesion locator circuit (1002), and then to the ROI placement circuits (1003 & 1004) and also to the lesion extraction circuit (1005). The data is passed through to the FFT circuit (1005) and to the power spectrum circuit (1006). Power spectrum data are passed to the texture measure circuit (1007), during which time the data are retained in image memory (1009). The data are also passed through to the gradient processing circuit (1010) and to the gradient feature extraction circuit (1011). The data are also passed through to the shape circuit (1012) and to the gray level calculation circuit (1013). All data then has the option of being passed to the classifier circuit (1014). In the superimposing circuit (1015) the results are either superimposed onto images, stored in file format, or given in text format. The results are then displayed on the display system (1020) after passing through a digital-to-analog converter (1030).

In FIG. 16, an image processing apparatus for implementing the processes of FIG. 1, is shown including an image acquisition device 102, such as a computed radiography system, a laser scanner, etc., and a computer 140, such as a general purpose computer. The computer 140 is shown in FIG. 17 and, for example, includes a display device 200, such as a touch screen monitor with a touch-screen interface, a keyboard 210, a pointing device 220, a digitizing pad 230, a hard disk 240, a floppy drive 250, a tape or CD ROM drive 260 with tape or CD media 270, and a mother board 280. The motherboard 280 includes a processor 290, a RAM 300, and a ROM 310, I/O ports 320 which are used to couple to the image acquisition device 102, and optional specialized hardware 330 for performing specialized hardware/software functions, such as sound processing, image processing, etc., a microphone 340, and a speaker or speakers 350.

Once an image is acquired by the image acquisition device 102, the computer 140, programmed with appropriate software, performs the processes of FIG. 1 with the functionality of FIG. 17 and displays the results of the analysis.

The present invention includes a computer program product, for implementing the processes of the present invention. The computer program product may be a storage medium, such as the tape or CD media 270 shown in FIG. 17, storing instructions and/or data structures which can be used to program the computer 140 to perform the process of the present invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions (e.g., the hard disk 240, the floppy drive 250, the tape or CD ROM drive 260 with the tape or the CD media 270, the RAM 300, and the ROM 310). However, this invention may be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

APPENDIX

1. American Cancer Society: Cancer Facts and Figures—1995. Atlanta: American Cancer Society, 1995.
2. Feig S A: Decreased breast cancer mortality through mammographic screening: Results of clinical trials. Radiology 167:659–665, 1988.
3. Tabar L, Fagerberg G, Duffy S W, Day N E, Gad A, Grontoft O: Update of the Swedish two-county program of mammographic screening for breast cancer. Radiol Clin North Am 30:187–210, 1992.
4. Smart C R, Hendrick R E, Rutledge J H, Smith R A: Benefit of mammography screening in women ages 40 to 49 years: Current evidence from randomized controlled trials. Cancer 75:1619–26, 1995.
5. Bassett L W, Gold R H: Breast Cancer Detection: Mammography and Other Methods in Breast Imaging New York: Grune and Stratton, 1987.
6. Kopans D B: Breast Imaging. Philadelphia: J B Lippincott, 1989.
7. Brown M L, Houn F, Sickles E A, Kessler L G: Screenig mammography in community practice: positive predictive value of abnormal findings and yield of follow-up diagnostic procedures. AJR 165:1373–1377, 1995.
8. Jackson V P: The role of US in breast imaging. Radiology 177:305–311, 1990.
9. Hilton S W, Leopold G R, Olson L K, Wilson S A: Real-time breast sonography: application in 300 consecutive patients. AJR 147:479–486, 1986.
10. Tohno E, Cosgrove D O, Sloane J P: Ultrasound Diagnosis of Breast Diseases. Churchill Livingstone, Edinburgh, 1994, pp. 50–73.
11. Fornage B D, Lorigan J G, Andry E: Fibroadenoma of the breast: sonographic appearance. Radiology 172:671–675, 1989.
12. Stavros A T, Thickman D, Rapp C L, Dennis M A, Parker S H, Sisney G A: Solid breast nodules: use of sonography to distinguish between benign and malignant lesions. Radiology 196:123–134, 1995.
13. Muller-Schimpfle M, Stoll P, Stern W. et al.: Do mammography, sonography, and MR mammography have a diagnostic benefit compared with mammography and sonography? AJR 168: 1323–1329, 1997.
14. Brinck U, Fischer U, Korabiowska M, et al.: The variability of fibroadenoma in contrast-enhanced dynamic MR mammography. AJR 168: 1331–1334, 1997.
15. Adams A H, Brookeman J R, Merickel M B: Breast lesion discrimination using statistical analysis and shape measures on magnetic resonance imagery. Comp Med Imaging and Graphics 15:339–349, 1991.
16. Huber S, Delorme S, Knopp M V, Junkermann H, Zuna I, von Fournier D, van Kaick G: Breast tumors: computer-assisted quantitative assessment with color Doppler US. Radiology 192:797–801, 1994.

What is claimed as new and desired to be secured by Letters Patent of the United States is:

1. A method for the analysis of a lesion existing in anatomical tissue, comprising:

obtaining first digital image data derived from an ultrasound image of the anatomical tissue in which the lesion exists;

determining a location of the lesion in relation to the first digital data;

selecting for feature extraction analysis at least one of 1) a region of interest on the margin of the lesion, and 2)

a region of interest which includes the lesion and a region of interest which is in the surrounding vicinity of the lesion, and 3) a region of interest which includes the lesion and a region of interest which is on the margin of the lesion;

extracting from each selected region of interest selected in said selecting step at least one first feature that characterize a lesion within said first image data; and characterizing said lesion based on the extracted at least one first feature.

2. The method according to claim 1, wherein said feature extracting step comprises:

extracting at least one geometric based feature of said lesion.

3. The method according to claim 2, wherein said feature extracting step comprises:

extracting geometric based features including depth and width of said lesion.

4. The method according to claim 1, wherein said feature extracting step comprises:

extracting at least one gray level based feature of said lesion.

5. The method according to claim 4, wherein said feature extracting step comprises:

extracting a feature within the lesion and a feature deep to the lesion.

6. The method according to claim 5, wherein gray levels are extracted within the lesion and deep to the lesion.

7. The method according to claim 6, wherein said feature extracting step comprises:

determining posterior shadowing and posterior enhancement of said lesion as a function of the ratio of the gray level within the lesion to the gray level deep to the legion.

8. The method according to claim 6, wherein said feature extracting step comprises:

extracting a gray level profile within the lesion and a gray level profile deep to the lesion.

9. The method according to claim 5, wherein said feature extracting step comprises:

extracting gradient based features within the lesion and deep to the lesion.

10. The method according to claim 1, wherein said feature extracting step comprises:

extracting at least one gradient based feature of said lesion.

11. The method according to claim 10, wherein said feature extracting step comprises:

obtaining a gradient and a gradient direction of each pixel in a ROI;

calculating a histogram and a weighted histogram for the pixels in the ROI;

determining as extracted features, based on the calculated histogram and the weighted histogram, at least one of the average value of the gradient-weighted histogram, the standard deviation of the gradient-weighted histogram, the angle where peak of gradient-weighted histogram occurs, the average angle of gradient-weighted histogram, and the full width at half maximum of the gradient-weighted histogram.

12. The method according to claim 10, wherein said feature extracting step comprises:

obtaining a gradient and a gradient direction of each pixel in a ROI;

calculating a histogram and a weighted histogram for the pixels in the ROI;

determining as extracted features, based on the calculated histogram and the weighted histogram, at least one of the normalized radial gradient along the entire margin of the lesion; the normalized radial gradient along only the posterior margin of the lesion; the normalized radial gradient along only the lateral margins of the lesion; the normalized radial gradient within a small neighborhood along the entire margin of the lesion; the normalized radial gradient within a small neighborhood along only the posterior margin of the lesion; and the normalized radial gradient within a small neighborhood along only the lateral margins of the lesion.

13. The method according to claim 1, wherein said feature extracting step comprises:

extracting at least one texture based feature of said lesion.

14. The method according to claim 13, wherein said feature extracting step comprises:

extracting a texture based fractal dimension for each ROI.

15. The method according to claim 13, comprising extracting texture based features within the lesion and deep to the lesion.

16. The method according to claim 1, wherein said feature extracting step comprises:

extracting and comparing features within said lesion and from the vicinity surrounding the lesion.

17. The method according to claim 1, wherein said feature extracting step comprises:

determining an amount of shadowing and enhancement through said lesion.

18. The method according to claim 17, wherein:

said feature extracting step comprises obtaining a profile across said lesion; and said step of determining comprises determining the amount of said shadowing and enhancement based on said profile.

19. The method according to claim 1, wherein said feature extracting step comprises:

obtaining plural profiles across said lesion;

determining a difference profile based on the obtained profiles; and determining a standard deviation of said difference profile.

20. The method according to claim 1, further comprising:

generating second digital image data from an x-ray mammographic image; and extracting a second feature that characterize a lesion within said second image data; and characterizing said lesion based on the extracted first and second features.

21. The method according to claim 20, further comprising:

obtaining third digital image data derived from a magnetic resonance image of the anatomical tissue; and extracting a third feature that characterize the lesion within said third image data; and characterizing said lesion based on the extracted first, second and third features.

22. The method according to claim 1, further comprising:

obtaining second digital image data derived from a magnetic resonance image of the anatomical tissue; and extracting a second feature that characterize the lesion within said second image data; and characterizing said lesion based on the extracted first and second features.

23. A computer readable medium storing computer instructions for computerized analysis of a lesion existing in anatomical tissue, by performing the steps of:

obtaining first digital image data derived from an ultrasound image of the anatomical tissue in which the lesion exists, determining a location of a lesion in said first digital image data;

selecting for feature extraction analysis at least one of 1) a region of interest on the margin of the lesion, and 2) a region of interest which include the lesion and a region of interest which is in the surrounding vicinity of the lesion, and 3) a region of interest which includes the lesion and a region of interest which is on the margin of the lesion;

extracting from each selected region of interest selected in said selecting step at least one first feature that characterize a lesion within said first image data; and characterizing said lesion based on the extracted at least one first feature.

24. The computer readable medium according to claim 23, wherein said feature extracting step comprises:

extracting at least one geometric based feature of said lesion.

25. The computer readable medium according to claim 24, wherein said feature extracting step comprises:

extracting geometric based features including depth and width of said lesion.

26. The computer readable medium according to claim 23, wherein said feature extracting step comprises:

extracting at least one gray level based feature of said lesion.

27. The computer readable medium according to claim 26, wherein said feature extracting step comprises:

extracting a feature within the lesion and a feature deep to the lesion.

28. The computer readable medium according to claim 26, wherein gray levels are extracted within the lesion and deep to the lesion.

29. The computer readable medium according to claim 28, wherein said feature extracting step comprises:

determining posterior shadowing and posterior enhancement of said lesion as a function of the ratio of the gray level within the lesion to the gray level deep to the legion.

30. The computer readable medium according to claim 28, wherein said feature extracting step comprises:

extracting a gray level profile within the lesion and a gray level profile deep to the lesion.

31. The computer readable medium according to claim 27, wherein said feature extracting step comprises:

extracting gradient based features within the lesion and deep to the lesion.

32. The computer readable medium according to claim 23, wherein said feature extracting step comprises:

extracting at least one gradient based feature of said lesion.

33. The computer readable medium according to claim 32, wherein said feature extracting step comprises:

obtaining a gradient and a gradient direction of each pixel in a ROI;

calculating a histogram and a weighted histogram for the pixels in the ROI;

determining as extracted features, based on the calculated histogram and the weighted histogram, at least one of the average value of the gradient-weighted histogram, the standard deviation of the gradient-weighted histogram, the angle where peak of gradient-weighted histogram occurs, the average angle of gradient-weighted histogram, and the full width at half maximum of the gradient-weighted histogram.

34. The computer readable medium according to claim 32, wherein said feature extracting step comprises:

obtaining a gradient and a gradient direction of each pixel in a ROI;

calculating a histogram and a weighted histogram for the pixels in the ROI;

determining as extracted features, based on the calculated histogram and the weighted histogram, at least one of the normalized radial gradient along the entire margin of the lesion; the normalized radial gradient along only the posterior margin of the lesion; the normalized radial gradient along only the lateral margins of the lesion; the normalized radial gradient within a small neighborhood along the entire margin of the lesion; the normalized radial gradient within a small neighborhood along only the posterior margin of the lesion; and the normalized radial gradient within a small neighborhood along only the lateral margins of the lesion.

35. The computer readable medium according to claim 23, wherein said feature extracting step comprises:

extracting at least one texture based feature of said lesion.

36. The computer readable medium according to claim 35, wherein said feature extracting step comprises:

extracting a texture based fractal dimension for each ROI.

37. The computer readable medium according to claim 35, comprising extracting texture based features within the lesion and deep to the lesion.

38. The computer readable medium according to claim 23, wherein said feature extracting step comprises:

extracting and comparing features within said lesion and from the vicinity surrounding the lesion.

39. The computer readable medium according to claim 23, wherein said feature extracting step comprises:

determining an amount of shadowing and enhancement through said lesion.

40. The computer readable medium according to claim 39, wherein:

said feature extracting step comprises obtaining a profile across said lesion; and said step of determining comprises determining the amount of said shadowing and enhancement based on said profile.

41. The computer readable medium according to claim 23, wherein said feature extracting step comprises:

obtaining plural profiles across said lesion:

determining a difference profile based on the obtained profiles; and determining a standard deviation of said difference profile.

42. The computer readable medium according to claim 23, further comprising:

obtaining second digital image data from an x-ray mammographic image of the anatomical tissue; and extracting a second feature that characterize the lesion within said second image data; and characterizing said lesion based on the extracted first and second features.

43. The computer readable medium according to claim 42, further comprising:

obtaining third digital image data derived from a magnetic resonance image of the anatomical tissue; and extracting a third feature that characterize the lesion within said third image data; and characterizing said lesion based on the extracted first, second and third features.

44. The computer readable medium according to claim 23, further comprising:

obtaining second digital image data derived from a magnetic resonance image of the anatomical tissue; and extracting a second feature that characterize the lesion within said second image data; and characterizing said lesion based on the extracted first and second features.

45. An apparatus for the analysis of a lesion in an image of anatomical tissue in which the lesion exists, comprising:

a mechanism configured to generate first digital image data representative of an ultrasound image;

a mechanism configured to determine a location of the lesion in said first digital image data;

a mechanism configured to select for feature extraction analysis at least one of 1) a region of interest on the margin of the lesion, and 2) a region of interest which include the lesion and a region of interest which is in the surrounding vicinity of the lesion, and 3) a region of interest which includes the lesion and a region of interest which is on the margin of the lesion;

a mechanism configured to extract from each selected region of interest selected in said selecting mechanism at least one first feature that characterize a lesion within said first image data; and a mechanism configured to characterize said lesion based on the extracted at least one first feature.

46. The apparatus according to claim 45 wherein said feature extracting mechanism comprises:

a mechanism configured to extract at least one geometric based feature of said lesion.

47. The apparatus according to claim 46, wherein said feature extracting mechanism comprises:

extracting geometric based features including depth and width of said lesion.

48. The apparatus according to claim 45, wherein said feature extracting mechanism comprises:

a mechanism configured to extract at least one gray level based feature of said lesion.

49. The apparatus according to claim 48, wherein said feature extracting mechanism comprises:

a mechanism configured to extract a feature within the lesion and a feature deep to the lesion.

50. The apparatus according to claim 49, wherein gray levels are extracted within the lesion and deep to the lesion.

51. The apparatus according to claim 50, wherein said feature extracting mechanism comprises:

a mechanism configured to determine posterior shadowing and posterior enhancement of said lesion as a function of the ratio of the gray level within the lesion to the gray level deep to the legion.

52. The apparatus according to claim 50, wherein said feature extracting mechanism comprises:

a mechanism configured to extract a gray level profile within the lesion and a gray level profile deep to the lesion.

53. The apparatus according to claim 49, wherein said feature extracting mechanism comprises:

a mechanism configured to extract gradient based features within the lesion and deep to the lesion.

54. The apparatus according to claim 45, wherein said feature extracting mechanism comprises:

a mechanism configured to extract at least one gradient based feature of said lesion.

55. The apparatus according to claim 54, wherein said feature extracting mechanism comprises:

a mechanism configured to obtain a gradient and a gradient direction of each pixel in a ROI;

a mechanism configured to calculate a histogram and a weighted histogram for the pixels in the ROI;

a mechanism configured to determine as extracted features, based on the calculated histogram and the weighted histogram, at least one of the average value of the gradient-weighted histogram, the standard deviation of the gradient-weighted histogram, the angle where peak of gradient-weighted histogram occurs, the average angle of gradient-weighted histogram, and the full width at half maximum of the gradient-weighted histogram.

56. The apparatus according to claim 54, wherein said feature extracting mechanism comprises:

a mechanism configured to obtain a gradient and a gradient direction of each pixel in a ROI;

a mechanism configured to calculate a histogram and a weighted histogram for the pixels in the ROI;

a mechanism configured to determine as extracted features, based on the calculated histogram and the weighted histogram, at least one of the normalized radial gradient along the entire margin of the lesion; the normalized radial gradient along only the posterior margin of the lesion; the normalized radial gradient along only the lateral margins of the lesion; the normalized radial gradient within a small neighborhood along the entire margin of the lesion; the normalized radial gradient within a small neighborhood along only the posterior margin of the lesion; and the normalized radial gradient within a small neighborhood along only the lateral margins of the lesion.

57. The apparatus according to claim 45, wherein said feature extracting mechanism comprises:

a mechanism configured to extract at least one texture based feature of said lesion.

58. The apparatus according to claim 57, wherein said feature extracting mechanism comprises:

a mechanism configured to extract a texture based fractal dimension for each ROI.

59. The apparatus according to claim 57, wherein said feature extracting mechanism comprises a mechanism configured to extract texture based features within the lesion and deep to the lesion.

60. The apparatus according to claim 45, wherein said feature extracting mechanism comprises:

a mechanism configured to extract and compare features within said lesion and from the vicinity surrounding the lesion.

61. The apparatus according to claim 45, wherein said feature extracting mechanism comprises:

determining an amount of shadowing and enhancement through said lesion.

62. The apparatus according to claim 61, wherein:

said feature extracting mechanism comprises obtaining a profile across said lesion; and said determining mechanism comprises determining the amount of said shadowing and enhancement based on said profile.

63. The apparatus according to claim 45, wherein said feature extracting mechanism comprises:
   a mechanism configured to obtain plural profiles across said lesion; a mechanism configured to determine a difference profile based on the obtained profiles; and
   a mechanism configured to determine a standard deviation of said difference profile.

64. The apparatus according to claim 45, further comprising: a mechanism configured to generate second digital image data from an x-ray mammographic image; and
   a mechanism configured to extract a second feature that characterize a lesion within said second image data; and
   a mechanism configured to characterize said lesion based on the extracted first and second features.

65. The apparatus according to claim 64, further comprising:
   a mechanism configured to obtain third digital image data derived from a magnetic resonance image of the anatomical tissue; and
   a mechanism configured to extract a third feature that characterize the lesion within said third image data; and
   a mechanism configured to characterize said lesion based on the extracted first, second and third features.

66. The apparatus according to claim 45, further comprising: a mechanism configured to obtain second digital image data derived from a magnetic resonance image of the anatomical tissue, and
   a mechanism configured to extract a second feature that characterize the lesion within said second image data; and
   a mechanism configured to characterize said lesion based on the extracted first and second features.

* * * * *